(12) United States Patent
Haberman

(10) Patent No.: US 6,216,410 B1
(45) Date of Patent: Apr. 17, 2001

(54) INTERLOCKING PANEL SYSTEM

(76) Inventor: Kurt Evan Haberman, P.O. Box 81232, Chamblee, GA (US) 30366

( * ) Notice: Subject to any disclaimer, the term of this patent is extended or adjusted under 35 U.S.C. 154(b) by 0 days.

(21) Appl. No.: 09/228,094

(22) Filed: Jan. 11, 1999

(51) Int. Cl.$^7$ ...................................................... E04B 2/08
(52) U.S. Cl. ...................... 52/591.1; 52/590.1; 52/590.2; 52/592.1; 52/585.1; 52/286; 52/604; 403/381
(58) Field of Search .................................... 52/578, 588.1, 52/591.1, 591.3, 590.1, 590.2, 592.1, 592.2, 592.3, 592.6, 589.1, 585.1, 604, 609, 286, 285.4; 403/381

(56) References Cited

U.S. PATENT DOCUMENTS

| | | | |
|---|---|---|---|
| 1,168,583 | * | 1/1916 | Volz ...................................... 52/590.1 |
| 1,278,194 | * | 9/1918 | Nelson et al. ....................... 52/591.1 |
| 1,684,050 | * | 9/1928 | Adams ................................. 52/590.2 |
| 2,099,149 | * | 11/1937 | Tunrquist ............................. 52/590.1 |
| 3,076,286 | * | 2/1963 | Czecholinski .................... 52/590.1 X |
| 3,269,070 | * | 8/1966 | Stoy ................................. 52/591.1 X |
| 3,305,982 | * | 2/1967 | Steele ................................. 52/286 X |
| 3,959,830 | * | 6/1976 | Van Den Broek .............. 52/592.1 X |
| 3,987,599 | | 10/1976 | Hines . |
| 4,126,972 | | 11/1978 | Silen . |
| 4,164,832 | | 8/1979 | Van Zandt . |
| 4,258,522 | * | 3/1981 | Amaral ................................ 52/286 X |
| 4,360,553 | | 11/1982 | Landheer . |
| 4,735,028 | | 4/1988 | Bouchon et al. . |
| 5,274,979 | | 1/1994 | Tsai . |
| 5,293,728 | | 3/1994 | Christopher et al. . |
| 5,348,778 | | 9/1994 | Knipp et al. . |
| 5,349,796 | | 9/1994 | Meyerson . |
| 5,367,844 | | 11/1994 | Diedrich . |
| 5,448,865 | | 9/1995 | Palmersten . |
| 5,502,939 | | 4/1996 | Zadok et al. . |
| 5,524,405 | | 6/1996 | Byrd . |
| 5,584,151 | | 12/1996 | Abou-Rached . |
| 5,595,038 | | 1/1997 | Prestenback . |
| 5,613,338 | | 3/1997 | Esposito . |
| 5,651,221 | | 7/1997 | Golen . |
| 5,699,644 | | 12/1997 | Smith . |
| 5,706,624 | | 1/1998 | Lipson . |

FOREIGN PATENT DOCUMENTS

| | | | | |
|---|---|---|---|---|
| 209542 | * | 6/1960 | (AT) | ..................................... 52/591.3 |
| 765870 | * | 4/1954 | (DE) | ..................................... 52/591.3 |
| 2050552 | * | 4/1972 | (DE) | ..................................... 52/592.2 |
| 1201567 | * | 1/1960 | (FR) | ..................................... 52/585.1 |
| 585506 | * | 2/1947 | (GB) | ..................................... 52/592.2 |
| 683893 | * | 3/1965 | (IT) | ..................................... 52/590.2 |

* cited by examiner

Primary Examiner—Laura A. Callo
(74) Attorney, Agent, or Firm—Bernstein & Associates; Jason A. Bernstein; John W. Greenwald

(57) ABSTRACT

A wall member with a first side having a tongue extending therefrom, a second side having a headed tongue extending therefrom, a third side having a groove defined therein for receiving a tongue of an adjacent panel, and a fourth side having a groove and cavity defined therein for slide-lock receiving of a headed tongue of an adjacent panel. The wall member may have a surface with a recess defined therein, and ribs extending from the recess. Also, the wall member may have a generally square, trapezoidal, hexagonal, or octagonal planar shape. Apertures may be defined in the tongue and grooves for aligning and receiving a dowel to lock panels together. A first corner section is defined by longitudinally extending the profile of the tongue through the profile of the headed tongue. A second corner section is defined by longitudinally extending the profile of the third side groove through the profile of the headed tongue. A third corner section is defined by longitudinally extending the profile of the fourth side groove and cavity through the third side groove. A fourth corner section is defined by longitudinally extending the profile of the fourth side groove and cavity through the tongue. Alternate embodiments provide corner panels, curved panels, and curved corner panels.

24 Claims, 19 Drawing Sheets

INTERLOCKING PANEL SYSTEM

FIELD OF THE INVENTION

The present invention relates to modular construction panels, and more particularly, to a modular panel with slide-lock tongue and groove sides and corners that interlock with the slide-lock tongue and groove sides of an adjacent panel to form a high-strength linear or curved wall, floor, ceiling, arch, dome, retaining wall, or the like.

BRIEF DESCRIPTION OF THE PRIOR ART

The construction of buildings is typically accomplished by the traditional method of erecting a wood, metal, or concrete frame, adding an interior finish layer such as drywall, wood paneling, plaster, ceiling and floor tiles, or the like, and adding an exterior finish layer such as aluminum or wood siding, marble, limestone, brick, or the like. There are a number of disadvantages to such conventional building methods. A large amount of construction material is required, and a tremendous amount of man-hours are required for sizing, cutting, and/or assembling the materials, including such tasks as welding, applying mortar, and installing rivets, bolts, screws, nails, adhesives, and like connectors.

Furthermore, a large majority of concrete and steel buildings are built with frames and enclosures as separate systems, where most enclosures typically do not have the strength to withstand extreme loads caused by catastrophic events such as tornadoes, hurricanes, earthquakes, explosions, fires, floods, and the like. In the case of wood frame structures, the entire building is often vulnerable to catastrophe. Moreover, because of the weight of steel and concrete, buildings constructed with these materials using conventional constructions techniques must bear a heavy load from the portion of the structure above. Additional disadvantages to conventional construction techniques include the necessity of providing expansion joints to allow for the different rates of expansion and contraction where employing more than one type of material, cracking of floors and walls due to settling of the earth, and the inability to quickly and easily assemble and disassemble a building, transport the components, and reassemble the same components.

Attempts to reduce the time and effort required to erect a wall have produced a number of modular panels. One type of panel commonly used has a core made of foam or a like insulating material, a skin made of sheet metal or the like, and a specialized interlocking structure on two opposing sides. Several such panels are disclosed by U.S. Pat. No. 5,502,939 to Zadok et al., U.S. Pat. No. 5,448,865 to Palmersten, U.S. Pat. No. 5,348,778 to Knipp et al., U.S. Pat. No. 5,595,038 to Prestenback, U.S. Pat. No. 4,360,553 to Landheer, U.S. Pat. No. 5,274,979 to Tsai, U.S. Pat. No. 5,293,728 to Christopher et al., U.S. Pat. No. 5,349,796 to Meyerson, and U.S. Pat. No. 5,613,338 to Esposito.

Such panels are provided with a skin in part because a skin is a structure that is well suited to form into specialized interlocking mechanisms. Because of the foam core and sheet metal skin construction, however, these panels generally do not have the strength to withstand extreme loads caused by catastrophic events. Such panels are most commonly used for applications where providing insulation and quick and easy assembly are primary factors, such as interior or exterior finish layers, non-load-bearing walls, walk-in refrigerator walls, and the like.

Other known panels provide a one-piece panel with tongue and groove connectors. Several such panels are disclosed by U.S. Pat. No. 4,164,832 to Van Zandt, U.S. Pat. No. 3,987,599 to Hines, and U.S. Pat. No. 5,367,844 to Diedrich.

Such panels provide modified tongue and groove connections for ease of assembly and disassembly, however, they do not interlock in such a way as to retain the tongue in the groove. These panels generally do not have the strength to withstand extreme loads caused by catastrophic events such as tornadoes, hurricanes, earthquakes, explosions, fires, floods, and the like. Such panels are most commonly used for applications such as interior or exterior finish layers, fences, non-load-bearing walls, and fences.

Still other known modular panel-type members provide high-strength characteristics, including U.S. Pat. No. 5,699,644 to Smith, U.S. Pat. No. 5,524,405 to Byrd, U.S. Pat. No. 4,735,028 to Bouchon et al., U.S. Pat. No. 5,584,151 to Abou-Rached, and U.S. Pat. No. 4,126,972 to Silen.

These panels do not provide a slide-lock mechanisms that retain a tongue in a groove; the time-consuming installation of studs, bolts, piles, or the like is required to lock the panels together. Many of these panels are bulky and made of concrete, and require heavy lifting equipment to install. Also, many of these panels achieve their high-strength characteristics because of their significant mass and weight. These panels, therefore, do not provide for quick and easy assembly, disassembly, and transport.

Accordingly, what is needed but not found or suggested in the prior art is a modular panel with slide-lock tongue and groove connections for constructing a high-strength building capable of withstanding extreme loads caused by catastrophic events, that is relatively light-weight relative to other known high-strength building materials, and that is also capable of quick and easy assembly and disassembly.

SUMMARY OF THE INVENTION

Generally described, the present invention provides a modular panel for interlocking with adjacent panels, comprising a wall member having at least four sides, the first side having at least one tongue extending therefrom, the second side having at least one slide-lock tongue extending therefrom with at least one head at the outer end of the tongue, the third side having at least one groove defined therein for receiving a tongue of a first side of an adjacent panel, the third side generally parallel and oppositely aligned with the first side, and the fourth side having at least one slide-lock groove defined therein with at least one cavity defined at the depth of the groove for receiving a tongue and a head of a second side of an adjacent panel, the fourth side generally parallel and oppositely aligned with the second side.

A first preferred embodiment of the present invention provides a first corner section defined by the intersection of the tongue of the first side and the tongue and head of the second side, the first corner section having at least one cutaway surface on the tongue and head of the second side defined by longitudinally extending the profile of the tongue of the first side through the tongue and head of the second side. A second corner section is defined by the intersection of the tongue and head of the second side and the third side, the second corner section having at least one cutaway surface on the tongue and head of the second side defined by longitudinally extending the profile of the groove of the third side through the tongue and head of the second side. A third corner section is defined by the intersection of the third side and the fourth side, the third corner section having at least one cutaway surface on at least one inner wall of the groove of the third side defined by longitudinally extending the profile of the groove and cavity of the fourth side through the third side. A fourth corner section is defined by the intersection of the fourth side and the first side, the fourth corner section having at least one cutaway surface on the tongue of the first side defined by longitudinally extending the profile of the groove and cavity of the fourth side through the tongue of the first side.

The tongue of the first side may have a generally parabolic profile and the groove of the third side may have a complementary generally parabolic profile. The head of the tongue of the second side may have a generally parabolic profile and the cavity of the groove of the fourth side may have a complementary generally parabolic profile. The head of the tongue of the second side may have at least one catch surface, and the cavity of the groove of the fourth side may have at least one complementary catch surface, for securing the head of the second side in a cavity of a fourth side of an adjacent panel while allowing sliding movement in a direction parallel with the second and fourth sides.

At least one aperture may be defined in the first side tongue and/or the second side tongue, at least one aperture may be defined in the third side or fourth side and alignable with the tongue aperture when the tongue is received in the groove of an adjacent panel, and a dowel may be provided that is receivable through the apertures.

The wall member may have a surface with a recess defined therein, and ribs extending from the recess. Also, the wall member may have a generally trapezoidal, hexagonal, or octagonal planar shape.

A second preferred embodiment of the present invention provides similar sides and corner sections of the first preferred embodiment. The second preferred embodiment additionally provides the tongues extending from the first and second sides at an angle from the plane of the wall member, and the grooves are defined in the third and fourth sides at an angle from the plane of the wall.

A third preferred embodiment of the present invention provides similar sides and corner sections of the first preferred embodiment. The third preferred embodiment additionally provides a wall member having a curvature relative to one or two axes.

A fourth preferred embodiment of the present invention provides similar sides and corner sections of the second preferred embodiment. The fourth preferred embodiment additionally provides a wall member having a curvature relative to one or two axes, similar to the panels of the third preferred embodiment.

The panels can be quickly and easily assembled and disassembled to construct of a wide variety of building sizes and shapes. For assembly, the tongues and grooves are cleaned, and an adhesive, lubricant and/or sealant is applied in the grooves. The groove of a first panel is placed onto the tongue of an adjacent panel, a starter piece, or the like. The tongue and head of a second panel are then aligned with and slid down into the groove and cavity of the first panel. The process is repeated until a row of panels is completed, and then the next row is begun by the same process. Disassembly is accomplished by the reverse process.

Accordingly, it is an object of the present invention to provide a construction article providing for quick and easy assembly and disassembly of a building, by providing a modular panel with tongue and groove connections for interlocking with the tongue and groove connections of an adjacent panel.

It is another object to provide a modular panel having interlocking connections on all sides, by providing a side having a headed tongue that slide-locks with a groove with a cavity in a side of an adjacent panel, and by providing aligning apertures in a tongue and in a grooved side of an adjacent panel for receiving a dowel to lock the panels together, with the result being a building that requires no foundation, no framing, no siding, no roofing, and no skilled labor.

It is a further object to provide a modular panel for constructing a high-strength building capable of withstanding extreme loads caused by catastrophic events, such as tornadoes, hurricanes, earthquakes, explosions and fire, by providing the panel with all sides and corners fully engaging the sides and corners of an adjacent panel with no gaps or voids therebetween, thereby preventing penetration by floodwaters, ants, roaches, and termites, by providing a panel with corner sections defined by longitudinally extending a profile of a side through a profile of an adjacent side.

It is a further object to provide a high-strength modular panel that is light-weight relative to other known high-strength building materials, by providing a wall member surface having a recess defined therein and ribs extending therefrom.

It is yet another object to provide a modular panel for constructing buildings in a wide variety of shapes and sizes, by providing panels having a generally square, trapezoidal, hexagonal, or octagonal planar shape, by providing panels having angled corner joints, by providing panels having a curvature relative to one or two axes, and by providing panels having a curvature and angled corner joints.

These and other objects, features, and advantages of the present invention are discussed or apparent in the following detailed description of the invention, in conjunction with the accompanying drawings and the appended claims.

BRIEF DESCRIPTION OF THE DRAWINGS

The various features and advantages of the invention will be apparent from the attached drawings, in which like reference characters designate the same or similar parts throughout the figures, and in which.

DETAILED DESCRIPTION OF THE PREFERRED EMBODIMENTS

Figure 1:
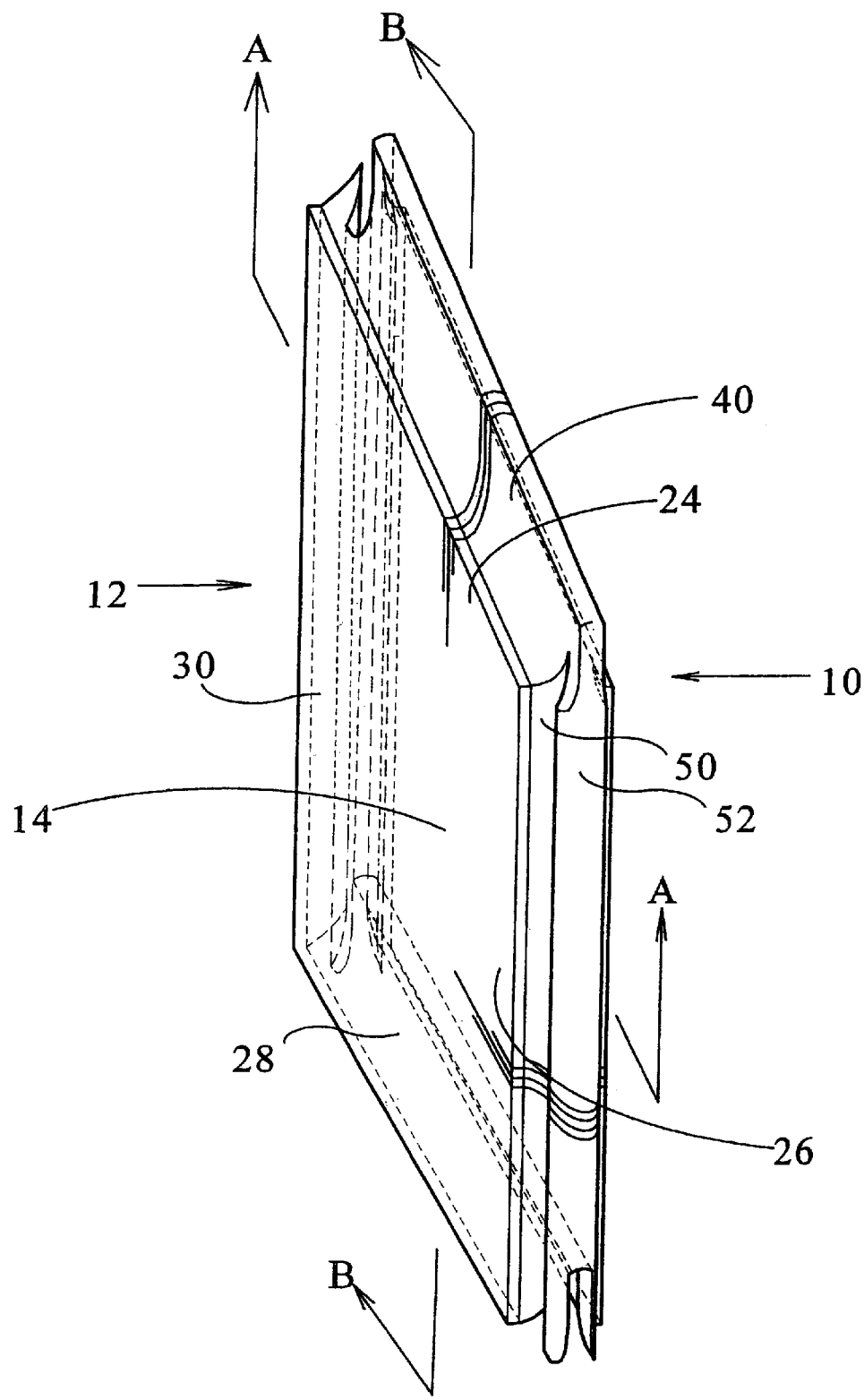
FIG. 1 is a perspective view of a first preferred embodiment of the present invention.

Referring to FIG. 1, there is illustrated a first preferred embodiment of the modular construction panel 10 of the present invention. A generally quadrilateral wall member 12 is preferably provided, having a square, oblong, trapezoidal, or like planar shape. Optionally, the wall member 12 can be provided in the shape of a polygon, such as but not limited to a triangle, hexagon, octagon, or other regular and irregular shapes known to those skilled in the art.

The panel 10 is preferably made from stainless steel by investment casting. This construction provides a monolithic structure that distributes forces very evenly. Optional construction techniques include precision and die casting, and other casting, forging, and molding methods known to those skilled in the art. Optional construction materials include common structural steel, aluminum alloys, iron, nickel and cobalt alloys such as but not limited to martensite steel, maraging steel, or chromium steel, thermoplastic resins such as but not limited to polypropylene or polyethylene, composite materials such as but not limited to concrete or graphite-based materials, and other materials known to those skilled in the art. All components of the panel 10, including the side and corner sections and the pins as described hereinafter, are constructed by the same or like techniques.

Figure 2:
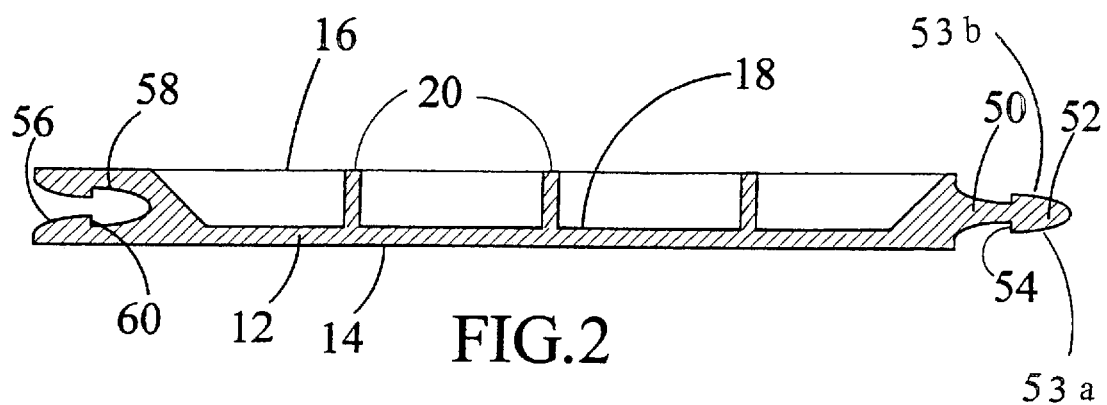
FIG. 2 is a sectional view of the first preferred embodiment taken at line A—A of FIG. 1.
Figure 3:
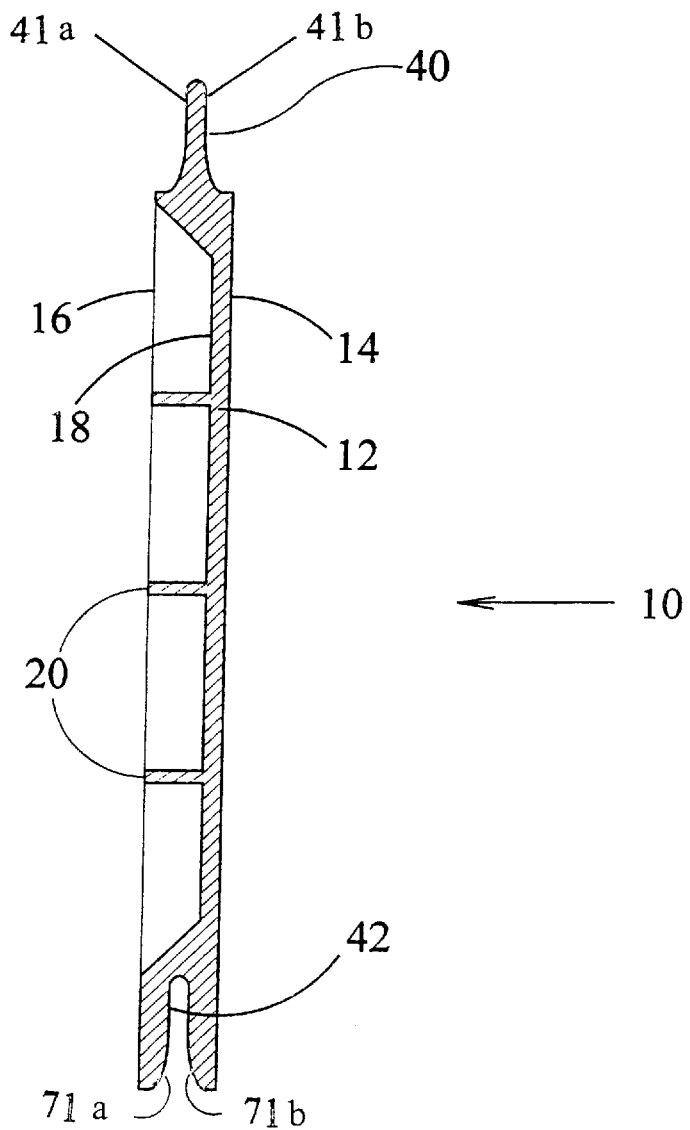
FIG. 3 is a sectional view of the first preferred embodiment taken at line B—B of FIG. 1.

Referring now to FIGS. 2 and 3, the wall member 12 has a first surface 14 that is preferably generally flat. The wall member 12 has a second surface 16 preferably having a recess 18 defined therein with ribs 20 in the recess 18. The mass and weight of the panel 10 may be minimized without sacrificing the structural integrity of the panel 10 by selecting the depth of the recess 18 so that the thickness of the wall member 12 between the first surface 14 and the second surface 16 is approximately the same as the thickness of the tongue 40, 50 to be described hereinafter. The ribs 20 provide structural strength, and preferably are provided with multiple rows and columns of intersecting ribs 20 to generally form a grid. The ribs 20 also prevent warping of the panel 10 after fabrication such as casting. Optionally, the wall member 12 can be provided without ribs 20 and/or without a recess 18.

Figure 4:
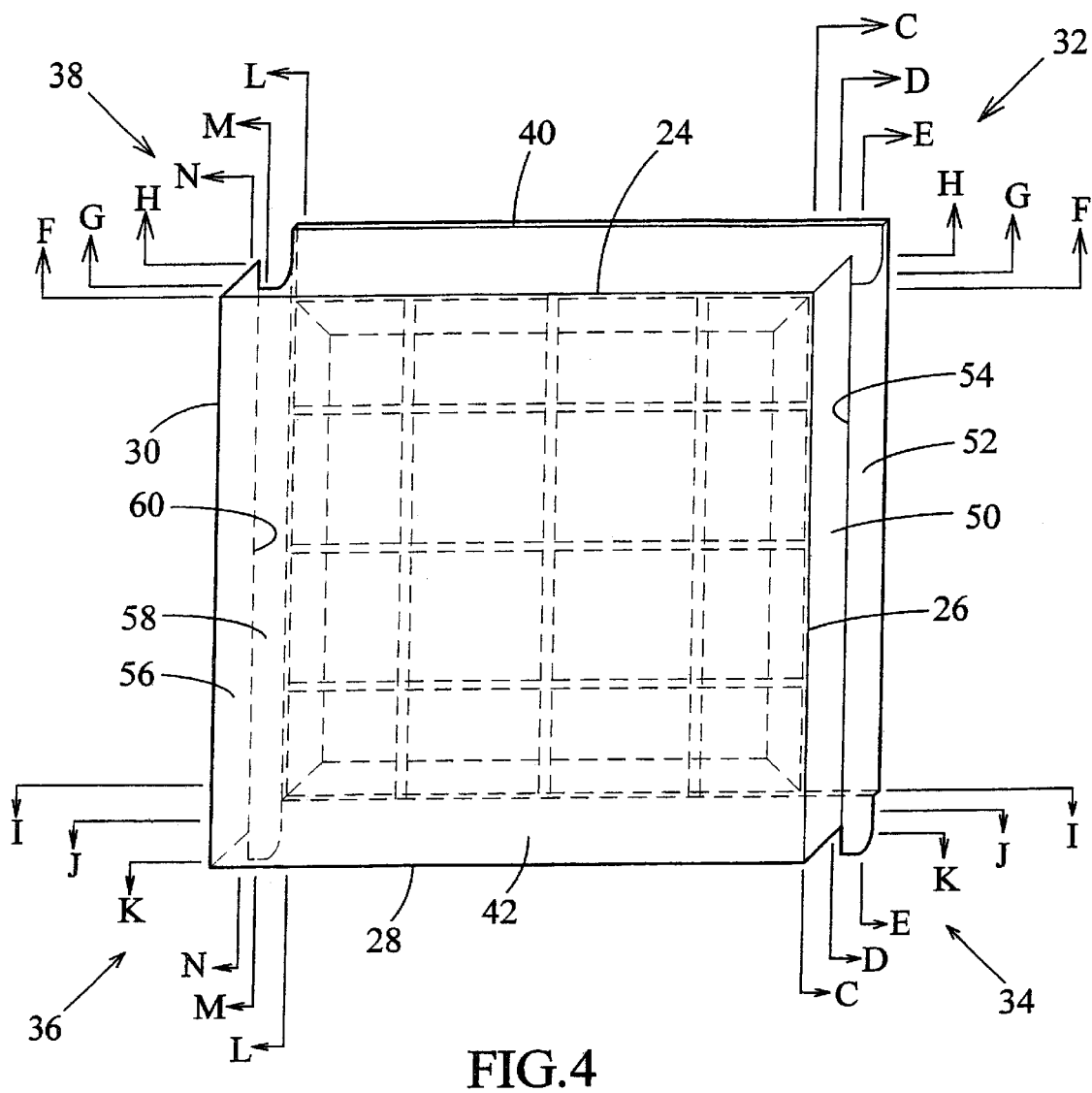
FIG. 4 is an elevation view of the first preferred embodiment.

Referring now to FIG. 4, the preferred embodiment of panel 10 has a first side 24, a second side 26, a third side 28, and a fourth side 30. The first side 24 and the third side 28 are preferably generally parallel and oppositely aligned, and the second side 26 and the fourth side 30 are preferably generally parallel and oppositely aligned. Optionally, the first side 24 and third side 28, or the second side 26 and a fourth side 30 may be provided at an angle, where the wall member 10 is provided with a trapezoidal, triangular, octagonal, or like shape. A first corner section 32 is provided at the intersection of extensions of the first side 24 and the second side 26, a second corner section 34 is provided at the intersection of extensions of the second side 26 and the third side 28, a third corner section 36 is provided at the intersection of extensions of the third side 28 and the fourth side 30, and a fourth corner section 38 is provided at the intersection of extensions of the fourth side 30 and the first side 24.

Figure 5:
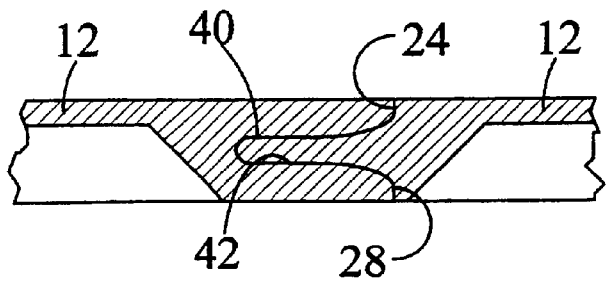
FIG. 5 is a detail view of the first side of a panel interlocking with the third side of an adjacent panel of the first preferred embodiment.

Referring to FIG. 5, the panel 10 preferably has interlocking joints on every side, so that every side acts to secure the panel 10 in place to provide a building with increased strength. The first side 24 has a tongue 40 extending therefrom and the third side 28 has a groove 42 defined therein, such that the tongue 40 mates with the groove 42 of an adjacent panel 10 as shown. The tongue 40 and the groove 42 each have a parabolic profile as shown, and preferably extend longitudinally substantially the entire length of the first side 24 and the third side 28 or optionally extend longitudinally on at least a substantial portion of the first side 24 and the third side 28, respectively. Optionally, the tongue 40 and the groove 42 may each be provided with a rectangular profile, a pointed end, or in other configurations known to those skilled in the art. The tongue 40 of a panel 10 is thereby permitted to be inserted and removed from the groove 42 of an adjacent panel 10 without the need to slide a panel 10 relative to an adjacent panel 10. The thickness of the tongue 40 is preferably selected to be approximately the same as the thickness of the wall member 12 between the first surface 14 and the recess 18 of the second surface 16 at the depth of the recess 18, as described heretofore, for maximum structural strength and minimum weight and mass.

Figure 6:
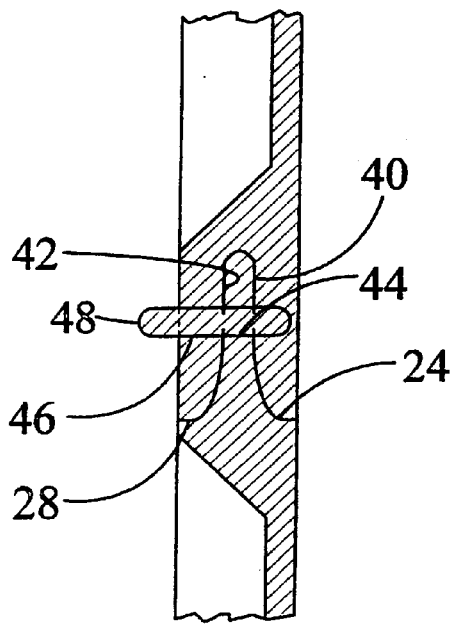
FIG. 6 is a detail view similar to FIG. 5, additionally showing the locking pin of the first preferred embodiment.

Referring to FIG. 6, the tongue 40 is preferably provided with at least one aperture 44 defined therein and the third side 28 is preferably provided with at least one aperture 46 defined therein, such that the tongue aperture 44 of a panel 10 and the third side aperture 46 of an adjacent panel 10 are capable of substantial alignment when a tongue 40 is received in the groove 42 of an adjacent panel 10. At least one locking pin 48, dowel, rivet, screw, or the like, is preferably provided for inserting through the aligned tongue aperture 44 and the third side aperture 46, to secure a tongue 40 in a groove 42 of an adjacent panel 10.

Figure 7:
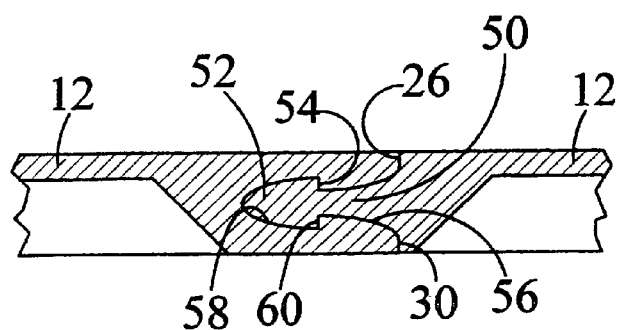
FIG. 7 is a detail view of the second side of a panel interlocking with the fourth side of an adjacent panel of the first preferred embodiment.

Referring to FIG. 7, the second side 26 has a slide-lock tongue 50 extending therefrom, and the tongue 50 has a head 52 or like enlarged portion at the outer end of the tongue 50. The head 52 has a catch surface 54 generally at the transition area where the tongue 50 enlarges to form the head 52. The fourth side 30 has a slide-lock groove 56 defined therein, with a cavity 58 or like enlarged portion defined at the depth of the groove 56. The cavity 58 has a catch surface 60 generally at the transition area where the groove 56 enlarges to form the cavity 58. The tongue 50 and head 52 of a panel 10 thereby mate with the groove 56 and cavity 58 of an adjacent panel 10 as shown. The head 52 and the cavity 58 each have a parabolic profile as shown, and the tongue 50 and head 52 and the groove 56 and cavity 58 each preferably extend longitudinally substantially the entire length of the second side 26 and the fourth side 30 or optionally extend longitudinally on at least a substantial portion of the second side 26 and the fourth side 30, respectively. Optionally, the head 52 and the cavity 58 may each be provided with a rectangular profile, a pointed end, or in other configurations known to those skilled in the art. The head catch surface 54 of a panel and the cavity catch surface 60 of an adjacent panel 10 thereby engage to prevent a panel 10 from being pulled laterally away from an adjacent panel 10. The tongue 50 and head 52 of a panel 10 are thereby permitted to be inserted and removed from the groove 56 and cavity 58 of an adjacent panel 10 only by sliding a panel 10 in a motion parallel to the second and fourths sides 26, 30.

Figure 8:
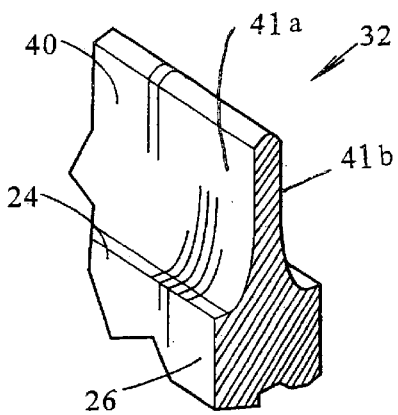
FIGS. 8–10 are perspective sectional views of the first corner section of the first preferred embodiment taken at lines C—C through E—E, respectively, of FIG. 4.
Figure 9:
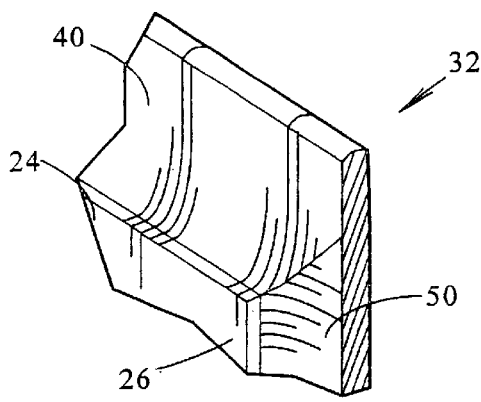
Figure 10:
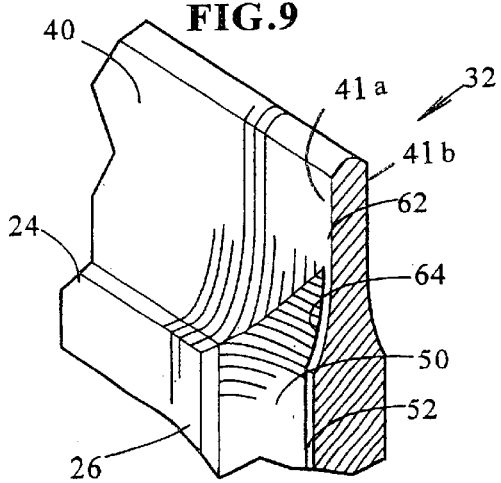

Referring now to FIGS. 8–13, there are illustrated sectional views showing the first corner section 32 at the intersection of the first side 24 and the second side 26. The first corner section 32 has a cutaway surface 62 formed on the faces 53a and 53b of the extended second side tongue 50 and head 52 and defined by longitudinally extending the profile of the first side tongue 40 through the extended second side tongue 50 and head 52. FIG. 8 is a sectional view taken at the edge of the first corner section 32 and the first side tongue 40, and therefore shows the profile of the first side tongue 40. FIGS. 9 and 10 are taken at progressive sections, and show the profile of the first side tongue 40 being longitudinally extended through the extended second side tongue 50 and head 52 to form the cutaway surface 62.

Figure 11:
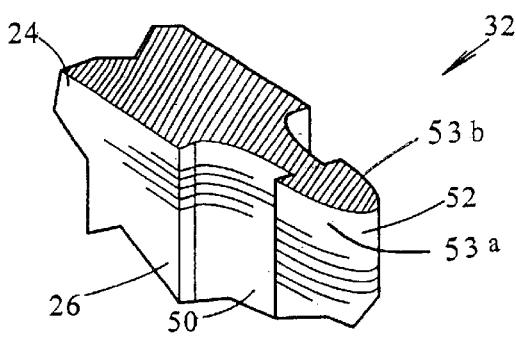
FIGS. 11–13 are perspective sectional views of the first corner section of the first preferred embodiment taken at lines F—F through H—H, respectively, of FIG. 4.
Figure 12:
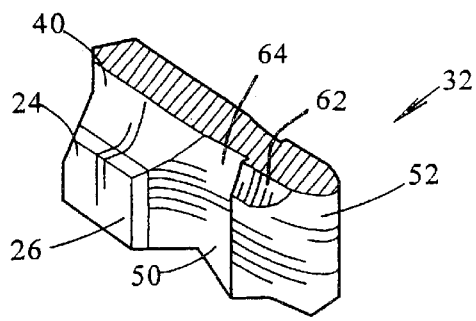
Figure 13:
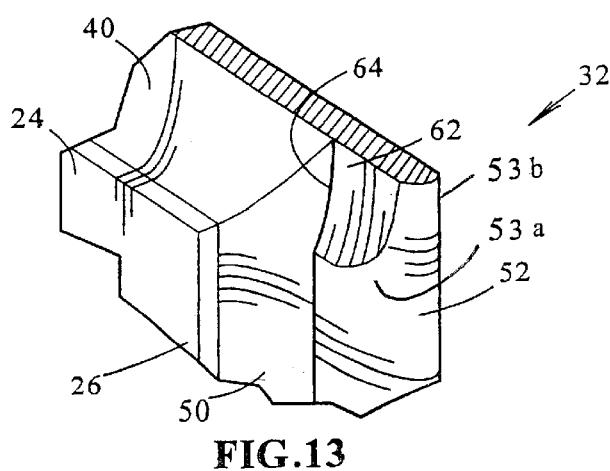

The cutaway surface 62 is preferably selected to provide all the material that is common to the intersection of the first side tongue 40 and the second side tongue 50 and head 52, so that the entire cutaway surface 62 contacts the entire surface of the third corner section as described hereinafter. This ensures that there are no gaps or voids permitting the intrusion of air, moisture, and the like, and produces significant strength of the interlocking connections. The cutaway surface 62 may therefore be alternately defined by the extended first side tongue 40, having the second side tongue 50 and head 52 longitudinally extended therethrough to preferably form two wedge-shaped channels 64 in the faces 41a and 41b of the extended first side tongue 40. FIG. 11 is a sectional view taken at the edge of the first corner section 32 and the second side tongue 50 and head 52, and therefore shows the profile of the second side tongue 50 and head 52. FIGS. 12 and 13 are taken at progressive sections, and show the profile of the second side tongue 50 and head 52 being longitudinally extended through the extended first side tongue 40 to form the cutaway surface 62.

Figure 14:
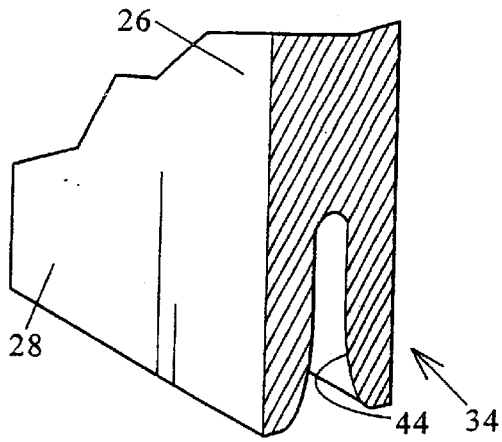
FIGS. 14–16 are perspective sectional views of the second corner section of the first preferred embodiment taken at lines C—C through E—E, respectively, of FIG. 4.
Figure 15:
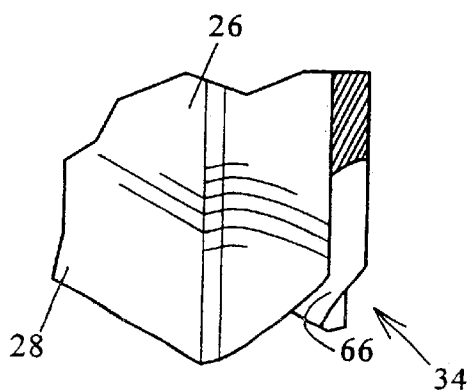
Figure 16:
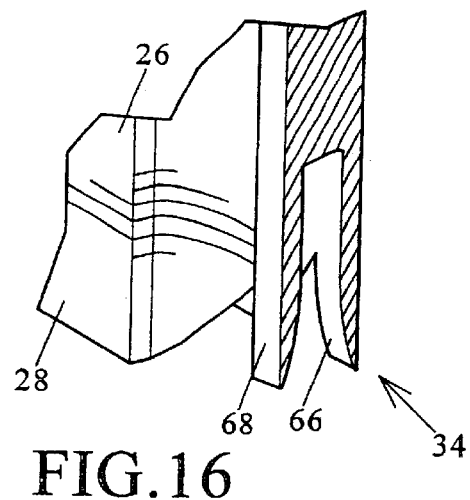

Referring now to FIGS. 14–19, there are illustrated sectional views showing the second corner section 34 at the intersection of the second side 26 and the third side 28. The second corner section 34 has a cutaway surface 66 formed on the second side tongue 50 and head 52 and defined by longitudinally extending the profile of the third side groove 42 through the extended second side tongue 50 and head 52. FIG. 14 is a sectional view taken at the edge of the second corner section 34 and the third side 28, and therefore shows the profile of the third side groove 42. FIGS. 15 and 16 are taken at progressive sections, and show the profile of the third side groove 42 being longitudinally extended through the extended second side tongue 50 and head 52 to form the cutaway surface 66.

Figure 17:
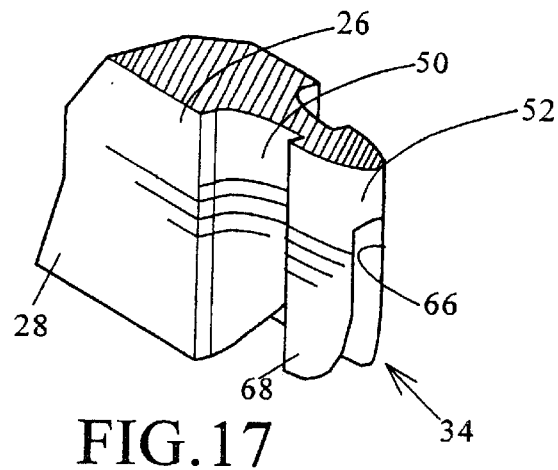
FIGS. 17–19 are perspective sectional views of the second corner section of the first preferred embodiment taken at lines I—I through K—K, respectively, of FIG. 4.
Figure 18:
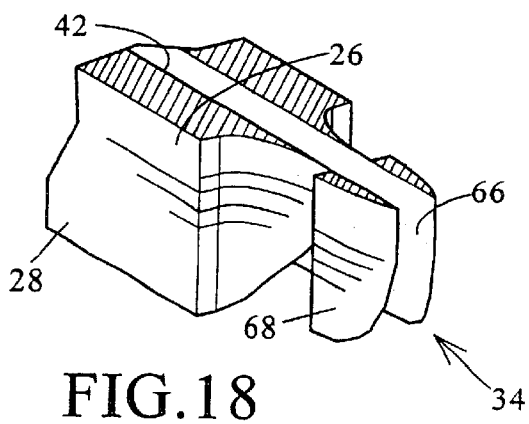
Figure 19:
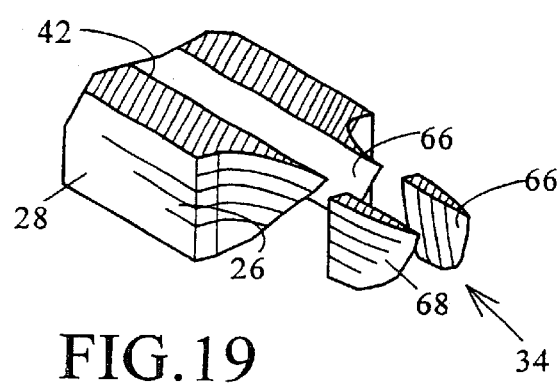

The cutaway surface 66 is preferably selected to provide all the material that is common to the intersection of the extended second side tongue 50 and head 52 and the extended third side 28, so that the entire cutaway surface 66 contacts the entire surface of the fourth corner section as described hereinafter. This ensures that there are no gaps or voids permitting the intrusion of air, moisture, and the like, and produces significant strength of the interlocking connections. The cutaway surface 66 may therefore be alternately defined by the extended third side 28, having the second side tongue 50 and head 52 longitudinally extended therethrough to preferably form two arms 68 longitudinally extending from the second side head 52. FIG. 17 is a sectional view taken at the edge of the first corner section 32 and the second side tongue 50 and head 52, and therefore shows the profile of the second side tongue 50 and head 52. FIGS. 18 and 19 are taken at progressive sections, and show the profile of the second side tongue 50 and head 52 being longitudinally extended through the extended third side 28 to form the cutaway surface 66.

Figure 20:
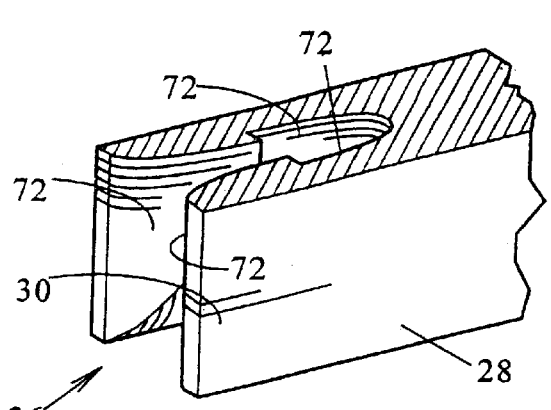
FIGS. 20–22 are perspective sectional views of the third corner section of the first preferred embodiment taken at lines I—I through K—K, respectively, of FIG. 4.
Figure 21:
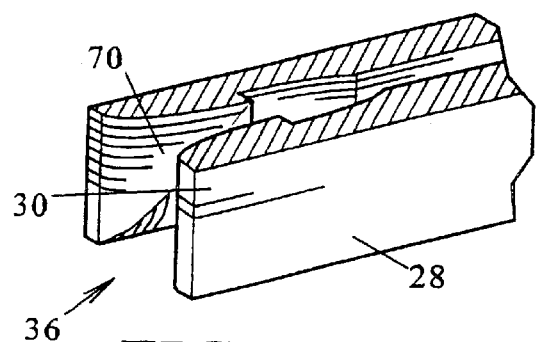
Figure 22:
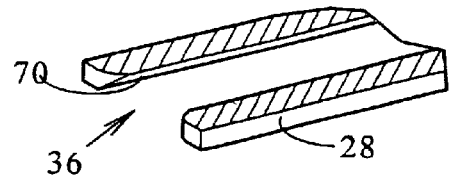

Referring now to FIGS. 20–25, there are illustrated sectional views showing the third corner section 36 at the intersection of the third side 28 and the fourth side 30. The third corner section 36 preferably has a cutaway surface 70 formed into the third side groove 42 and defining inner walls 71a and 71b of the groove 42 and defined by longitudinally extending the profile of the fourth side groove 56 and cavity 58 through the third side 28. FIG. 20 is a sectional view taken at the edge of the third corner section 36 and the fourth side 30, and therefore shows the profile of the fourth side groove 56 and cavity 58. FIGS. 21 and 22 are taken at progressive sections, and show the profile of the fourth side groove 56 and cavity 58 being longitudinally extended through the extended third side 28 to form the cutaway surface 70, which may include four wedge-shaped channels 72 defined in the third side groove 42.

Figure 23:
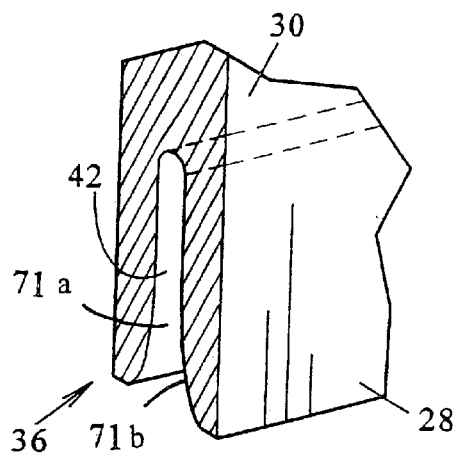
FIGS. 23–25 are perspective sectional views of the third corner section of the first preferred embodiment taken at lines L—L through N—N, respectively, of FIG. 4.
Figure 24:
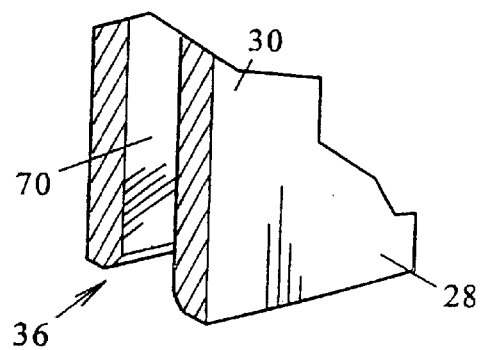
Figure 25:
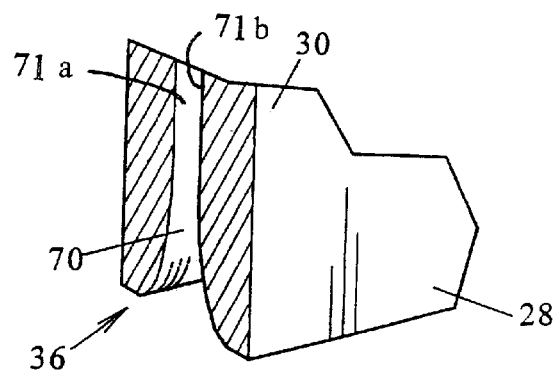

The cutaway surface 70 is preferably selected to provide all the material that is common to the intersection of the extended third side 28 and the extended fourth side 30, so that the entire cutaway surface 70 contacts the entire surface 62 of the first corner section 32 as described heretofore. This ensures that there are no gaps or voids permitting the intrusion of air, moisture, and the like, and produces significant strength of the interlocking connections. The cutaway surface 70 may therefore be alternately defined by the extended fourth side 30, having the third side groove 42 longitudinally extended therethrough. FIG. 23 is a sectional view taken at the edge of the third corner section 36 and the third side 28, and therefore shows the profile of the third side groove 42. FIGS. 24 and 25 are taken at progressive sections, and show the profile of the third side groove 42 being longitudinally extended through the extended fourth side 30 to form the cutaway surface 70.

Figure 26:
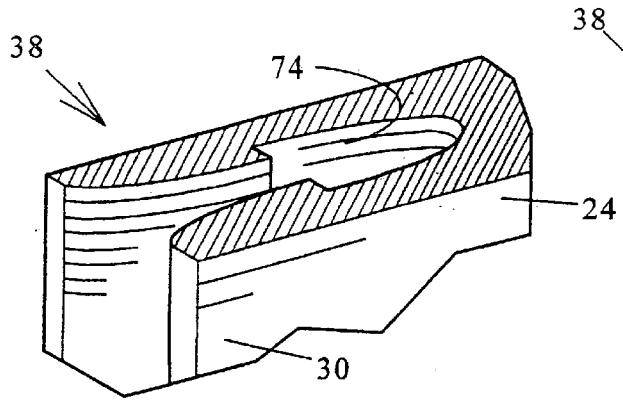
FIGS. 26–28 are perspective sectional views of the fourth corner section of the first preferred embodiment taken at lines F—F through H—H, respectively, of FIG. 4.
Figure 27:
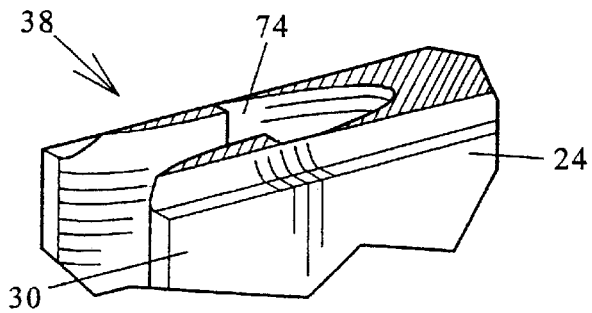
Figure 28:
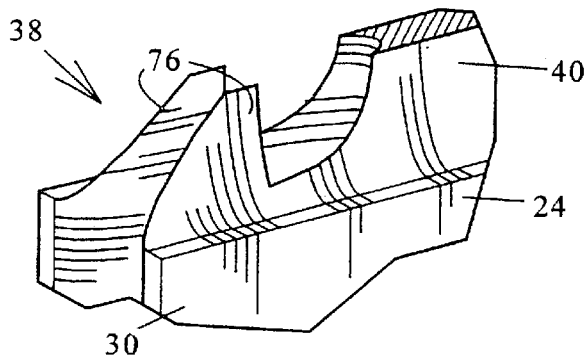

Referring now to FIGS. 26–31, there are illustrated sectional views showing the fourth corner section 38 at the intersection of the fourth side 30 and the first side 24. The fourth corner section 38 preferably has a cutaway surface 74 formed into the first side tongue 40 and defined by longitudinally extending the profile of the fourth side groove 56 and cavity 58 through the first side tongue 40. FIG. 26 is a sectional view taken at the edge of the fourth corner section 38 and the fourth side 30, and therefore shows the profile of the fourth side groove 56 and cavity 58. FIGS. 27 and 28 are taken at progressive sections, and show the profile of the fourth side groove 56 and cavity 58 being longitudinally extended through the extended first side tongue 40 to form the cutaway surface 74, which forms two wedge-shaped arms 76 extending from the first side 24.

Figure 29:
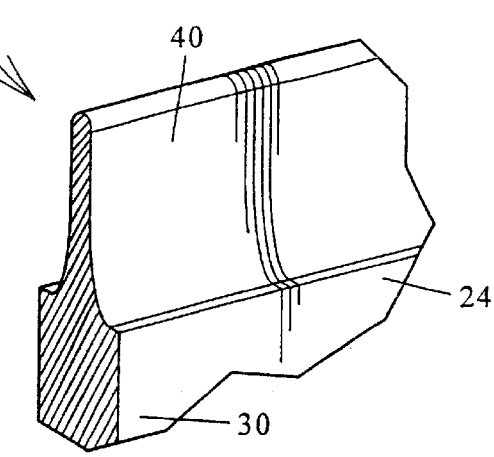
FIGS. 29–31 are perspective sectional views of the fourth corner section of the first preferred embodiment taken at lines L—L through N—N, respectively, of FIG. 4.
Figure 30:
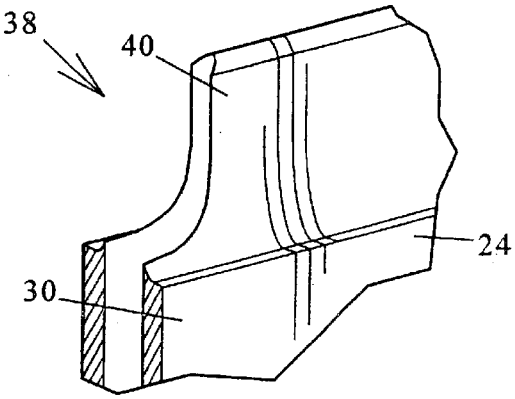
Figure 31:
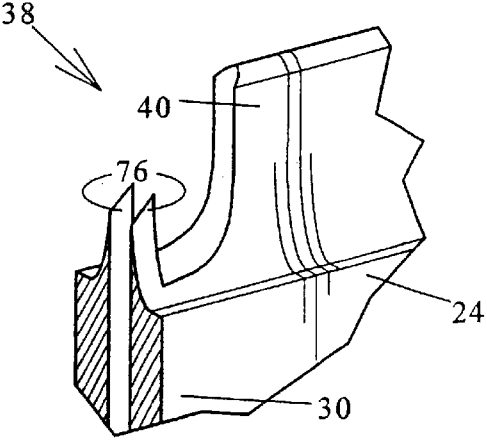

The cutaway surface 74 is preferably selected to provide all the material that is common to the intersection of the extended fourth side 30 and the extended first side tongue 40, so that the entire cutaway surface 74 contacts the entire surface 66 of the second corner section 34 as described heretofore. This ensures that there are no gaps or voids permitting the intrusion of air, moisture, and the like, and produces significant strength of the interlocking connections. The cutaway surface 74 may therefore be alternately defined by the extended fourth side 30, having the first side tongue 40 longitudinally extended therethrough. FIG. 29 is a sectional view taken at the edge of the fourth corner section 38 and the first side 24, and therefore shows the profile of the first side tongue 40. FIGS. 30 and 31 are taken at progressive sections, and show the profile of the first side tongue 40 being longitudinally extended through the extended fourth side 30 to form the cutaway surface 74.

Figure 32:
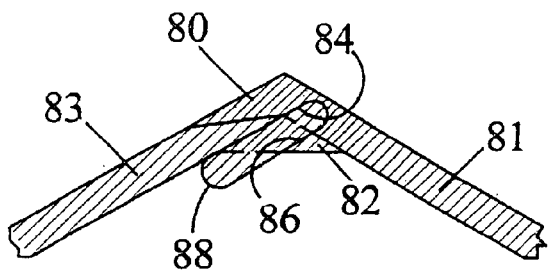
FIGS. 32–35 are detail views of linear panels with interlocking angled corner joints of a second preferred embodiment of the present invention.
Figure 33:
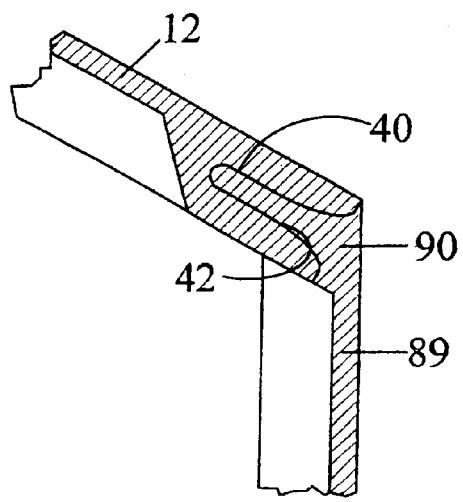
Figure 34:
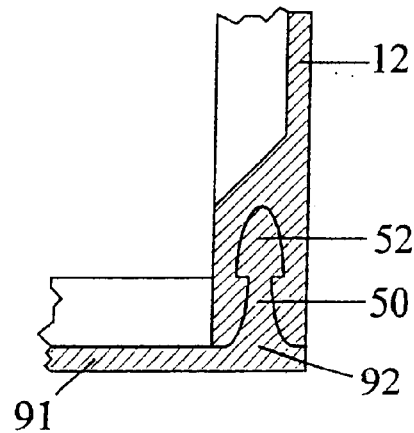
Figure 35:
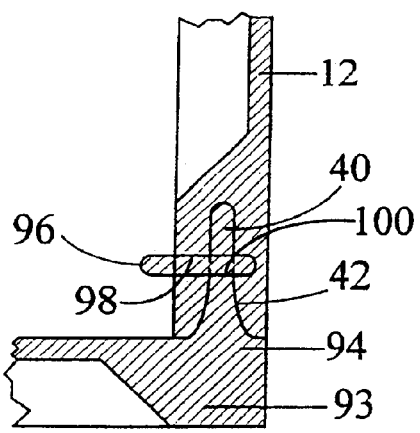
Figure 36:
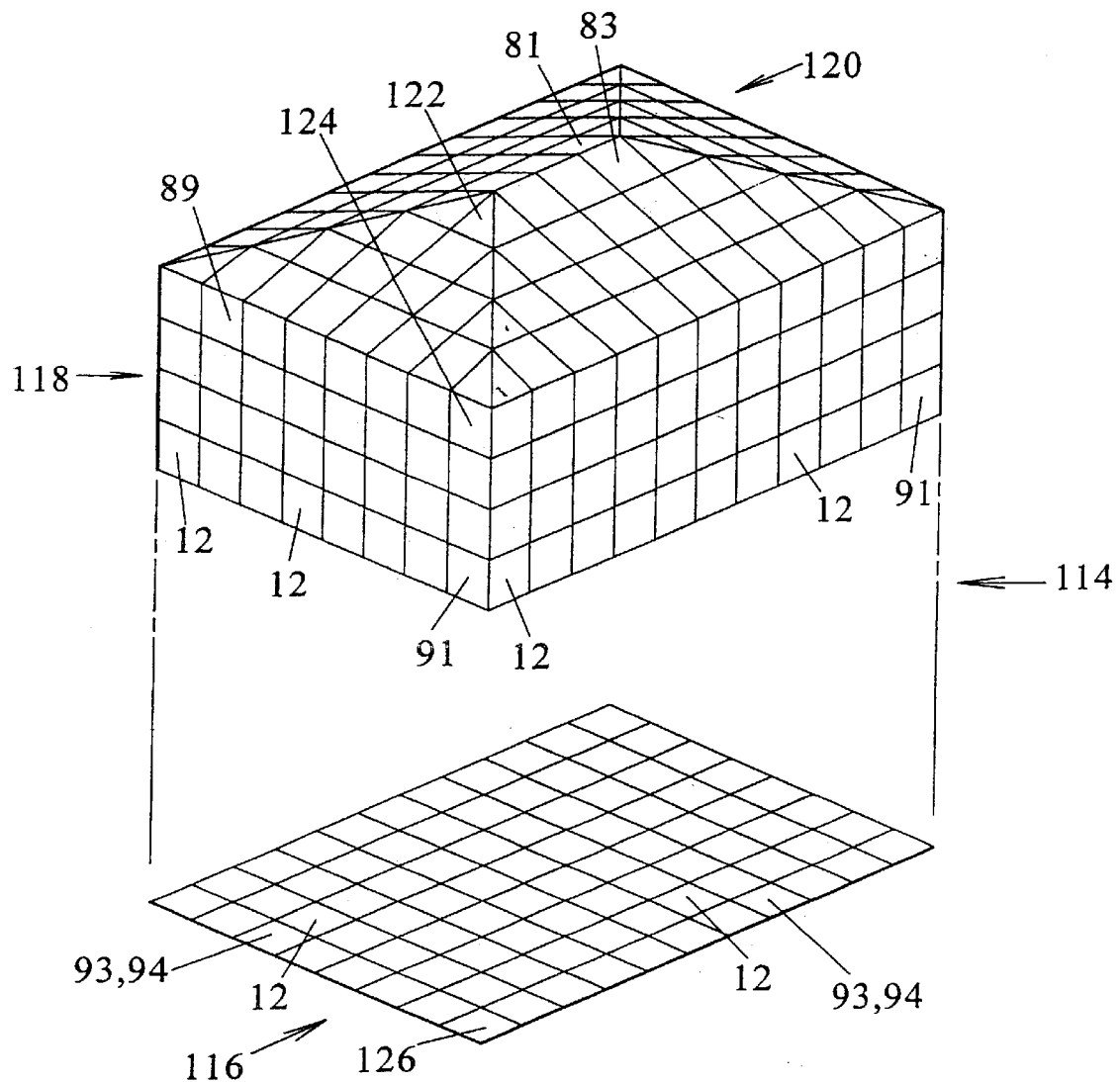
FIG. 36 is perspective view of a building constructed from the first and second preferred embodiments.

In a second preferred embodiment, as shown in FIGS. 32–35, there is provided the panel 10 of the first preferred embodiment with modified wall members for providing a variety of interlocking angle joints. The angle joints are necessary to connect walls, floors, and ceilings together when constructing a building made from the panels 10 of the present invention. FIG. 32 shows two modified wall members 81, 83 with angled end portions 80, 82 each having an aperture 84, 86 defined therein for aligning and receiving a locking pin 88, dowel, rivet, screw, or the like, to secure the wall members 14 together to form the crest of a pitched roof that can only be unlocked from the interior of the building. FIG. 33 shows a modified wall member 89 with an angled end portion 90 having a tongue 40 extending therefrom at an angle, for receiving by a groove 42 of a wall member 12 for securing together to form the connection of a wall to a pitched roof. FIG. 34 shows a corner wall member 91 similar to the wall member of FIG. 33, except the tongue 50 is provided with a head 52 and the angle is ninety degrees, for connecting a wall member 12 to the corner wall member 91. FIG. 35 shows a corner floor member 93 similar to the wall member of FIG. 33, except the tongue 40 is provided at an angle of approximately ninety degrees and a locking pin 96, dowel, rivet, screw, or the like, is provided for inserting through aligned apertures 98, 100 in the tongue 40 and groove 42, for connecting a wall member 12 to the floor member 93. The locking pin 96 or the like inserted through aligned apertures 98, 100 prevent separation of the wall member 12 and the floor member 93 under extreme positive or negative pressure conditions such as a tornado. Referring now to FIG. 36, there is illustrated a building 114 constructed from panels 10 of the present invention. A floor 116 is generally constructed from panels 10 with wall members 12 of the first preferred embodiment, with an outermost row constructed of panels 10 with corner floor members 93 having interlocking angle joints of the second preferred embodiment as shown in FIG. 35 and described heretofore. Building walls 118 are generally constructed from panels 10 with wall members 12 of the first preferred embodiment, with corner panels 10 having corner wall members 91 with interlocking angle joints of the second preferred embodiment as shown in FIG. 34 and described heretofore, and an upper most row constructed of panels 10 having wall members 89 with interlocking angle joints of the second preferred embodiment as shown in FIG. 33 and described heretofore. A roof 120 is generally constructed from panels 10 with wall members 12 of the first preferred embodiment, with an uppermost row constructed of panels 10 with wall members 81, 83 having interlocking angle joints of the second preferred embodiment as shown in FIG. 32 and described heretofore. Additional panels 10 are provided with further modified wall members 122, 124, 126 which are generally minor variations from and combinations of the embodiments described heretofore and are apparent therefrom.

Figure 37:
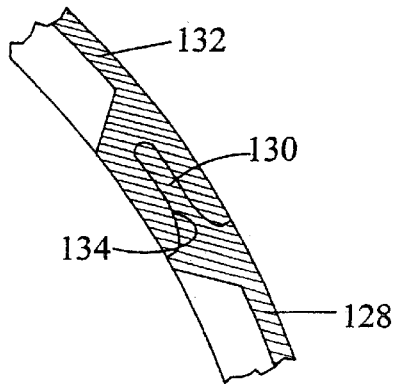
FIGS. 37–39 are detail views of a curved panel with interlocking angled joints of a third preferred embodiment of the present invention.
Figure 38:
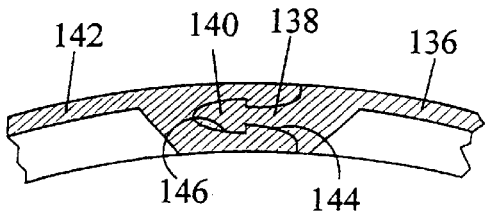
Figure 39:
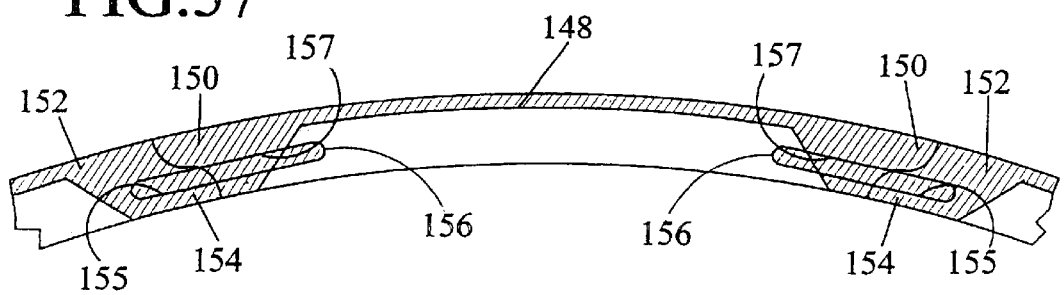

In a third preferred embodiment, as shown in FIGS. 37–39, there is provided a panel 10 of the first preferred embodiment as described heretofore, having modified wall members for providing a curved surface. A curved surface is necessary to construct walls, domed ceilings, barrel vault ceilings, spheres, and the like. Panels may be provided with a curvature relative to one axis, such as for a cylindrical wall, or with a curvature relative to two axes, such as for a domed ceiling. FIG. 37 shows a curved wall member 128 having a curved tongue 130 extending therefrom, and a curved wall member 132 having a curved groove 134 defined therein, such that the groove 134 of a panel 10 matingly receives the tongue 130 of an adjacent panel 10. FIG. 38 shows a curved wall member 136 having a curved tongue 138 extending therefrom and with a head 140 at the outer portion of the tongue 138, and a curved wall member 142 having a curved groove 144 defined therein and with a cavity 146 defined at the depth of the groove 144, such that the groove 144 and cavity of a panel 10 matingly receives the tongue 138 and head 140 of an adjacent panel 10. FIG. 39 shows a curved cap member 148 having S-shaped ends 150 that are matingly receivable by S-shaped ends 154 of curved members 152. An aperture 155, 157 is defined in the S-shaped members 150, 154 for aligning and receiving a locking pin 156, dowel, rivet, screw, or the like, therethrough.

Figure 40:
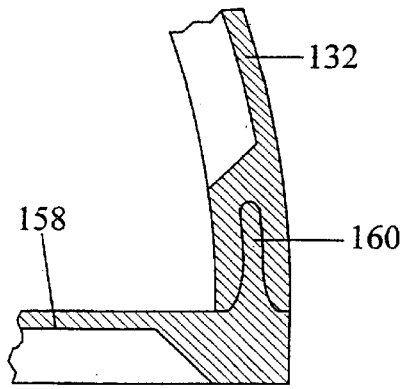
FIG. 40 is a detail view of a curved panel with interlocking angled corner joints of a fourth preferred embodiment of the present invention.
Figure 41:
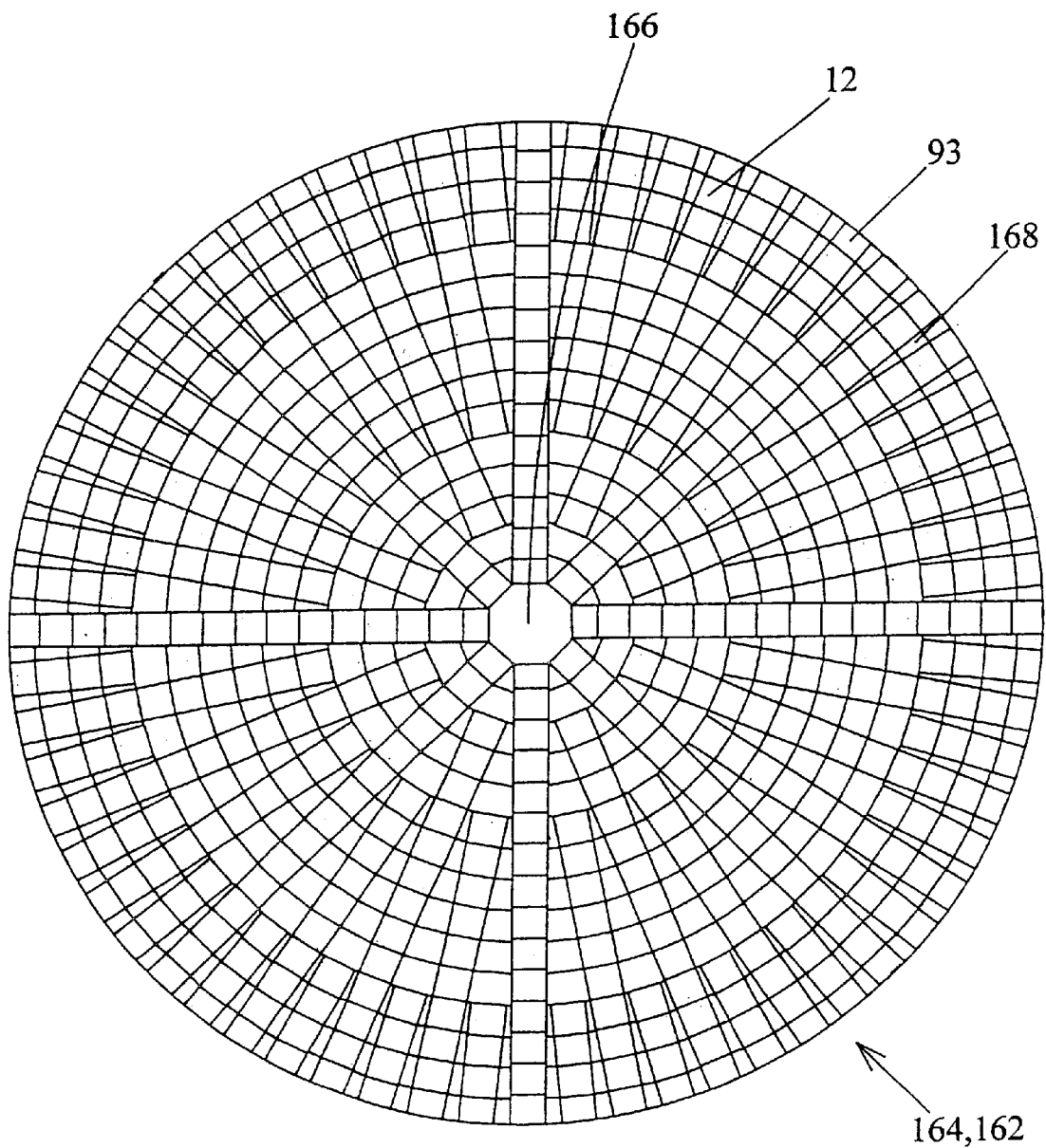
FIG. 41 is a plan view of a floor constructed from the first and fourth preferred embodiments.

In a fourth preferred embodiment, as shown in FIG. 40, there is provided a panel 10 of the second preferred embodiment having interlocking angle joints as described heretofore, and further having a curvature to the angled joints. A panel 10 with a curved and angled joint is necessary to connect floors to curved walls, such as for barrel vault ceilings, spheres, and the like. FIG. 40 shows a wall member 158 having a tongue 160 extending therefrom at an angle, and having a curvature to the tongue 160.

Figure 42:
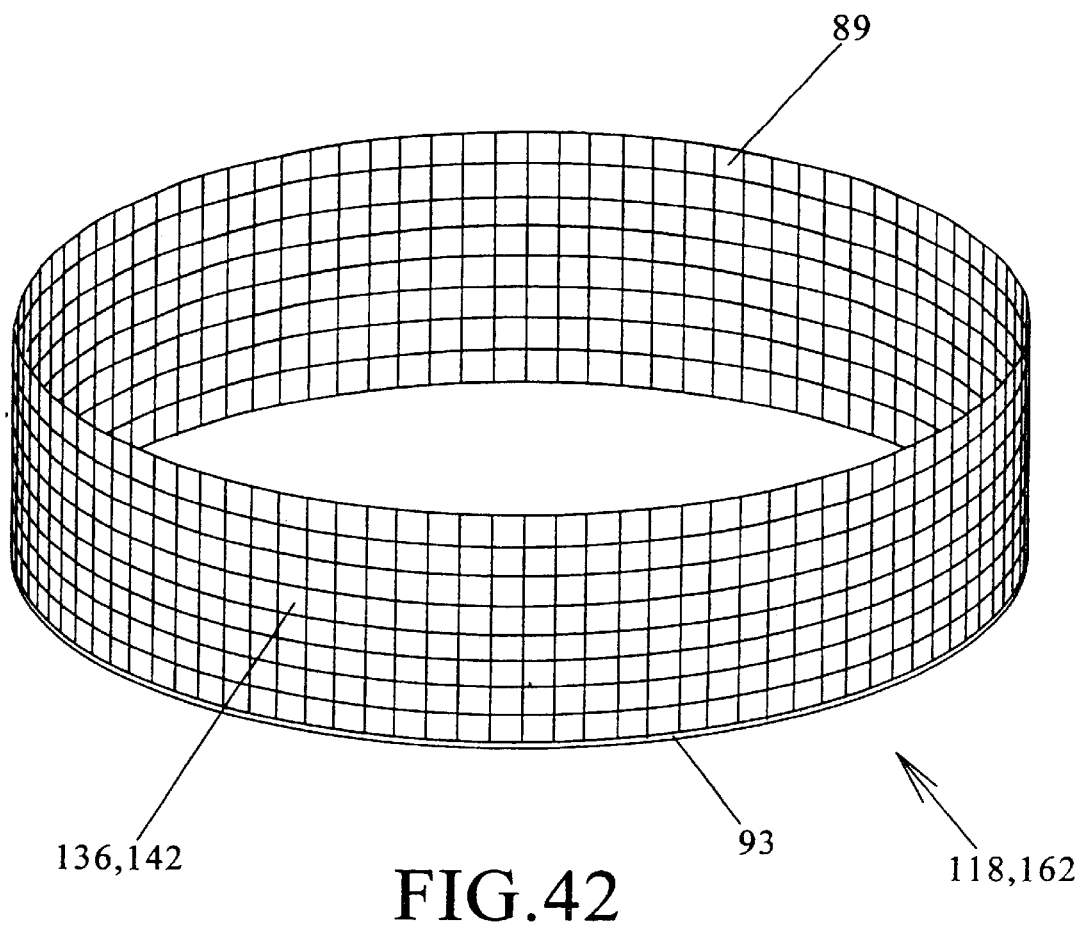
FIG. 42 is a perspective view of walls for a cylindrical building constructed from the third preferred embodiment.
Figure 43:
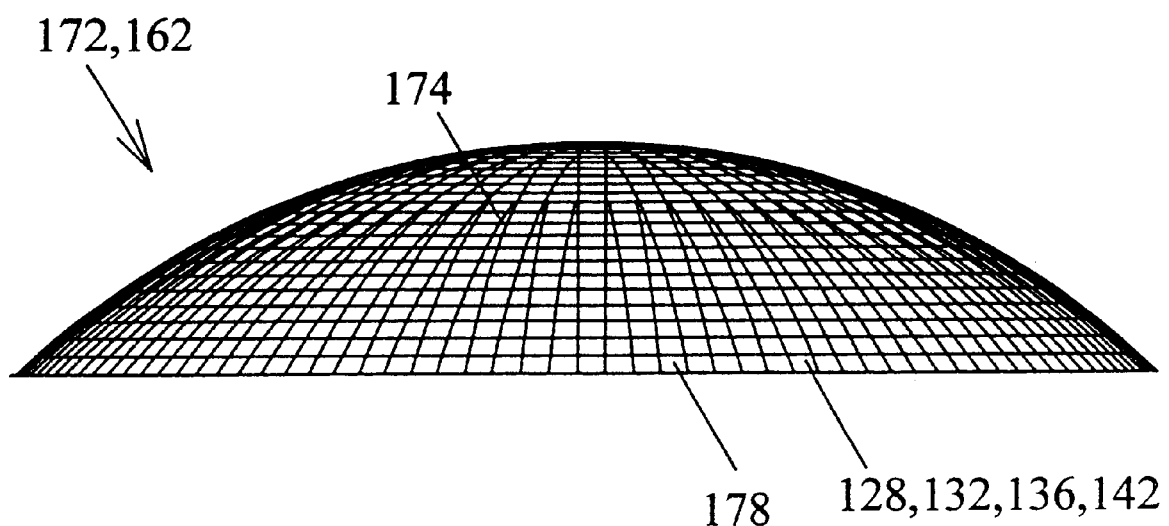
FIG. 43 is an elevation view of a domed roof constructed from the third preferred embodiment.
Figure 44:
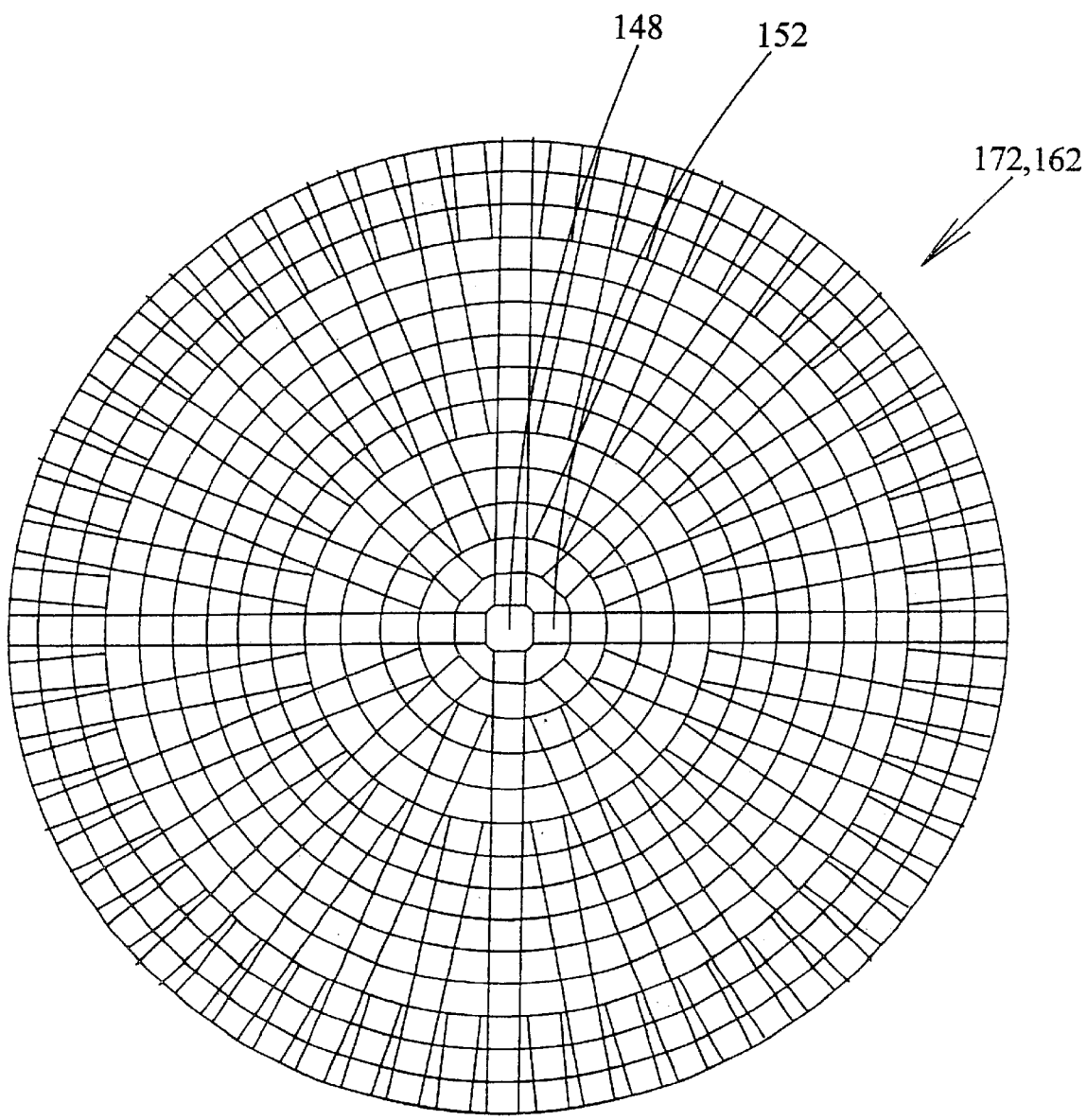
FIG. 44 is a plan view of the domed roof of FIG. 43.

Referring now to FIGS. 41–44, there is illustrated a cylindrical domed building 162 constructed from panels 10 of the present invention. A floor 164 is generally constructed from panels 10 with wall members 12 of the first preferred embodiment, with an outermost row constructed of panels 10 with wall members 93 having curved and angled interlocking joints of the second preferred embodiment as shown in FIG. 35 and described heretofore. Cylindrical building walls 118, as shown in FIG. 42, are generally constructed from panels 10 with curved wall members 136, 142 of the third preferred embodiment with the curvature relative to one axis, as shown in FIG. 38 and described heretofore. A domed ceiling 172, as shown in FIGS. 43 and 44, is generally constructed from panels 10 with curved wall members 128, 132, 136, 142 of the third preferred embodiment with the curvature relative to two axes, as shown in FIGS. 37 and 38 and described heretofore. As shown in FIG.

44, an uppermost row is constructed from panels 10 with curved wall members 152 of the third preferred embodiment, and lastly a panel 10 with a curved cap 148 of the third preferred embodiment is placed at the top of the domed ceiling 172, as shown in FIG. 39 and described heretofore. Additional panels 10 are provided with further modified wall members 166, 168, 174, 178 which are generally minor variations from and combinations of the embodiments described heretofore and are apparent therefrom.

Figure 45:
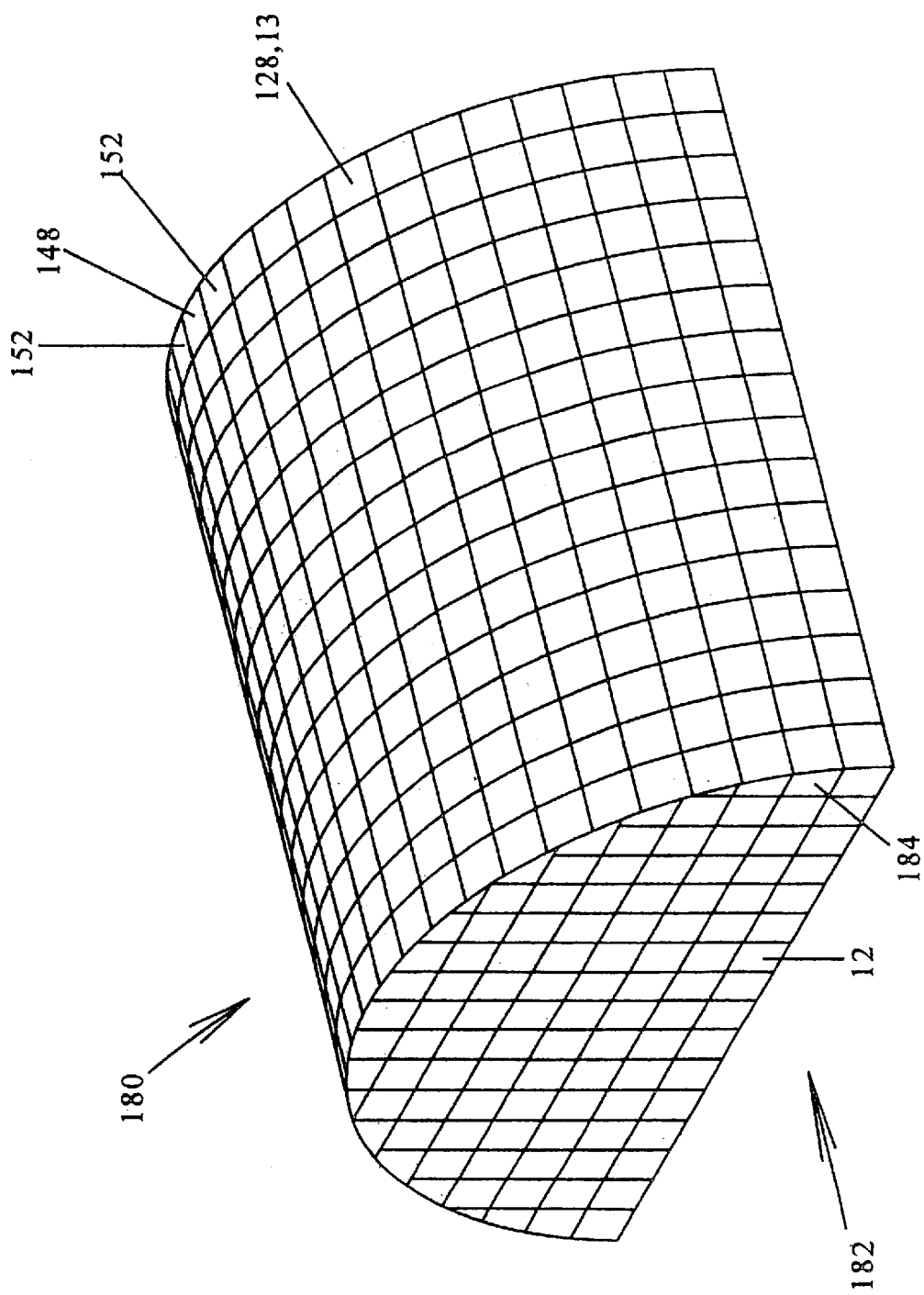
FIG. 45 is a perspective view of a barrel vault roof constructed from the first and third preferred embodiments.

Referring now to FIG. 45, there is illustrated a barrel vault ceiling 180 constructed from panels 10 of the present invention. A wall 182 is generally constructed from panels 10 with wall members 12 of the first preferred embodiment. An arched ceiling is generally constructed from panels 10 with curved wall members 128, 132 of the third preferred embodiment with the curvature relative to one axis, as shown in FIG. 37 and described heretofore. An uppermost row is constructed from panels 10 with curved wall members 152, the curvature relative to one axis, of the third preferred embodiment, and lastly a panel 10 with a curved cap 148 of the third preferred embodiment is placed at the top of the arched ceiling 180, as shown in FIG. 39 and described heretofore. Additional panels 10 are provided with further modified wall members 184 which are generally minor variations from and combinations of the embodiments described heretofore and are apparent therefrom.

Figure 46:
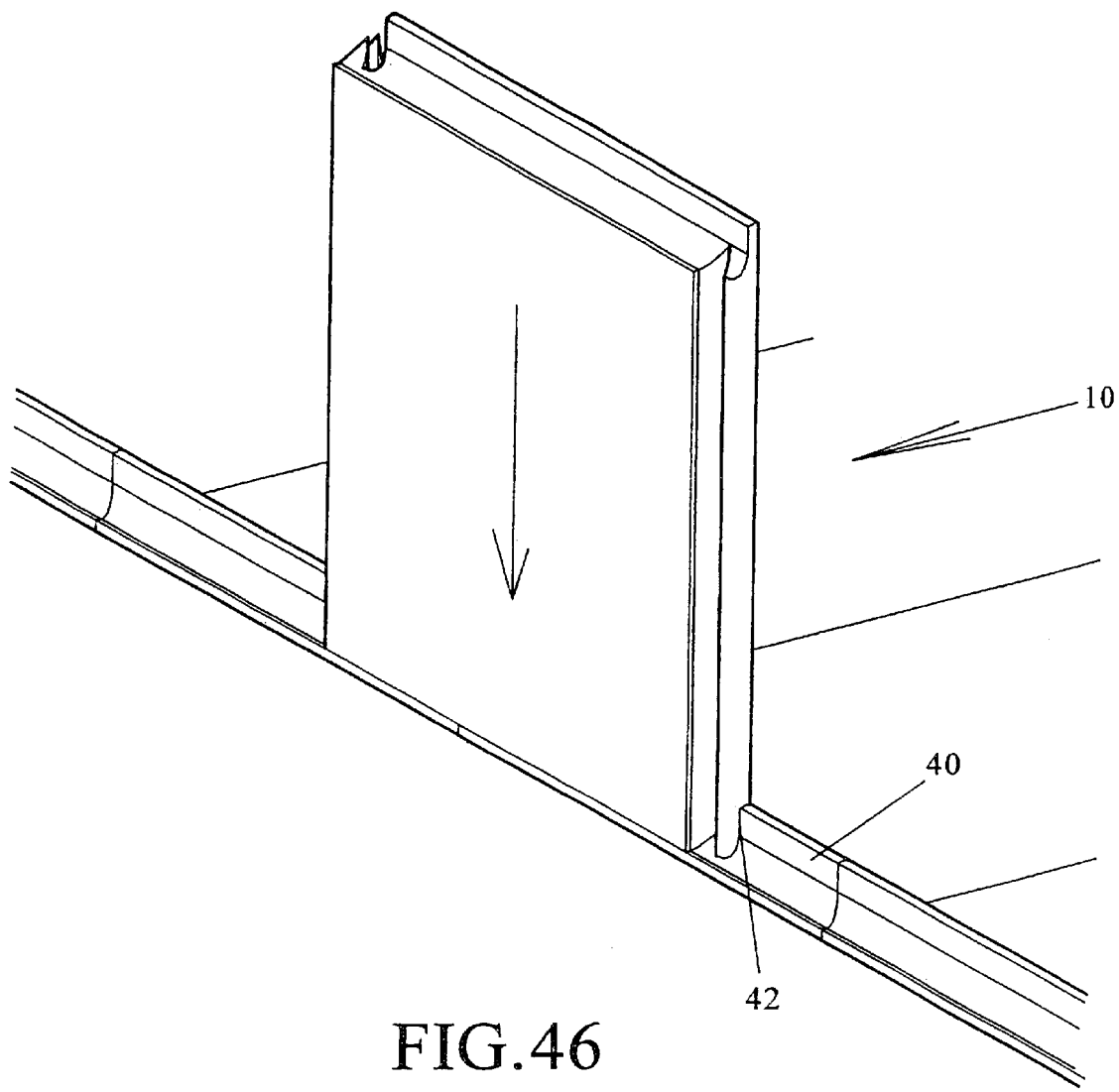
FIGS. 46–48 are perspective views showing installation of the first preferred embodiment.
Figure 47:
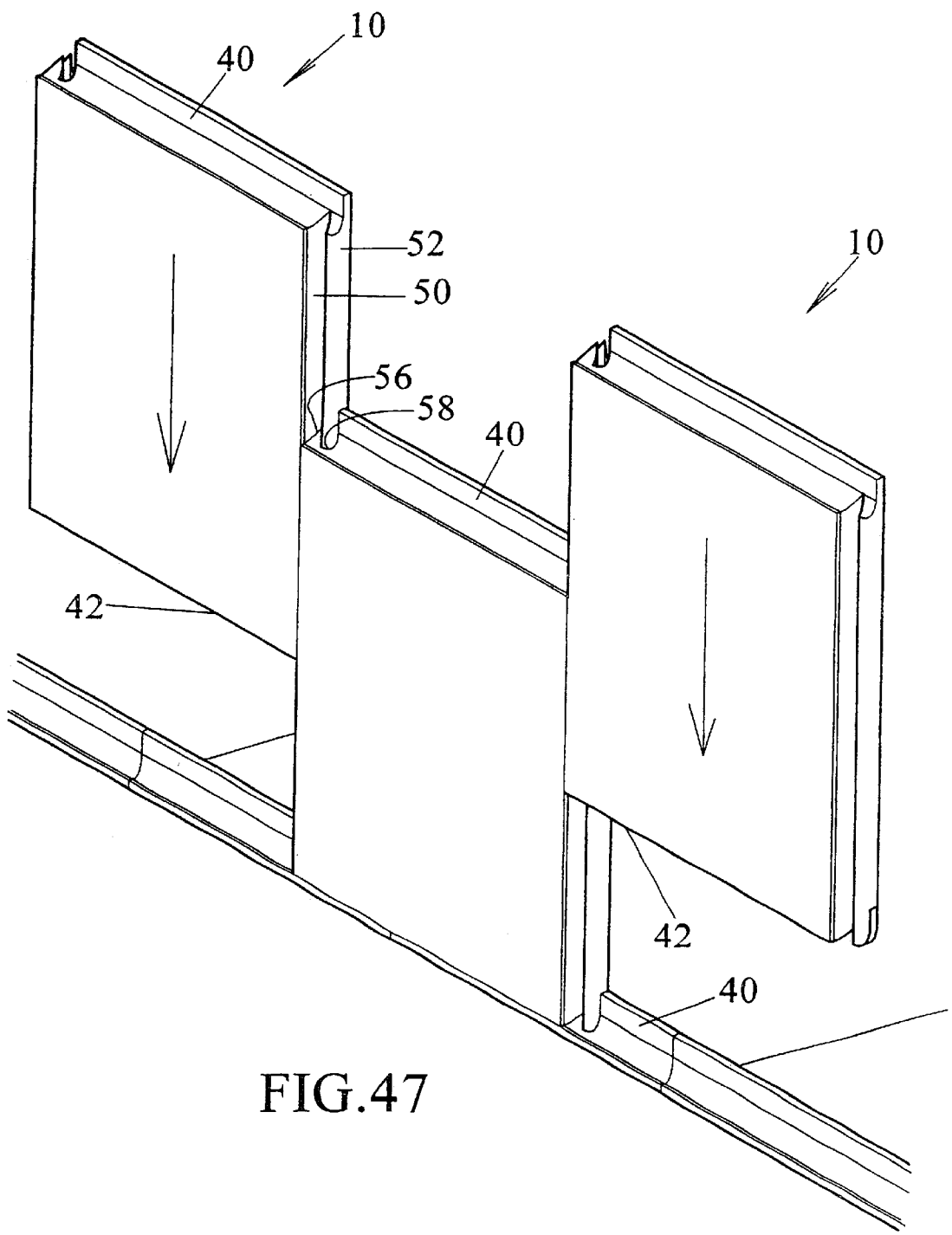
Figure 48:
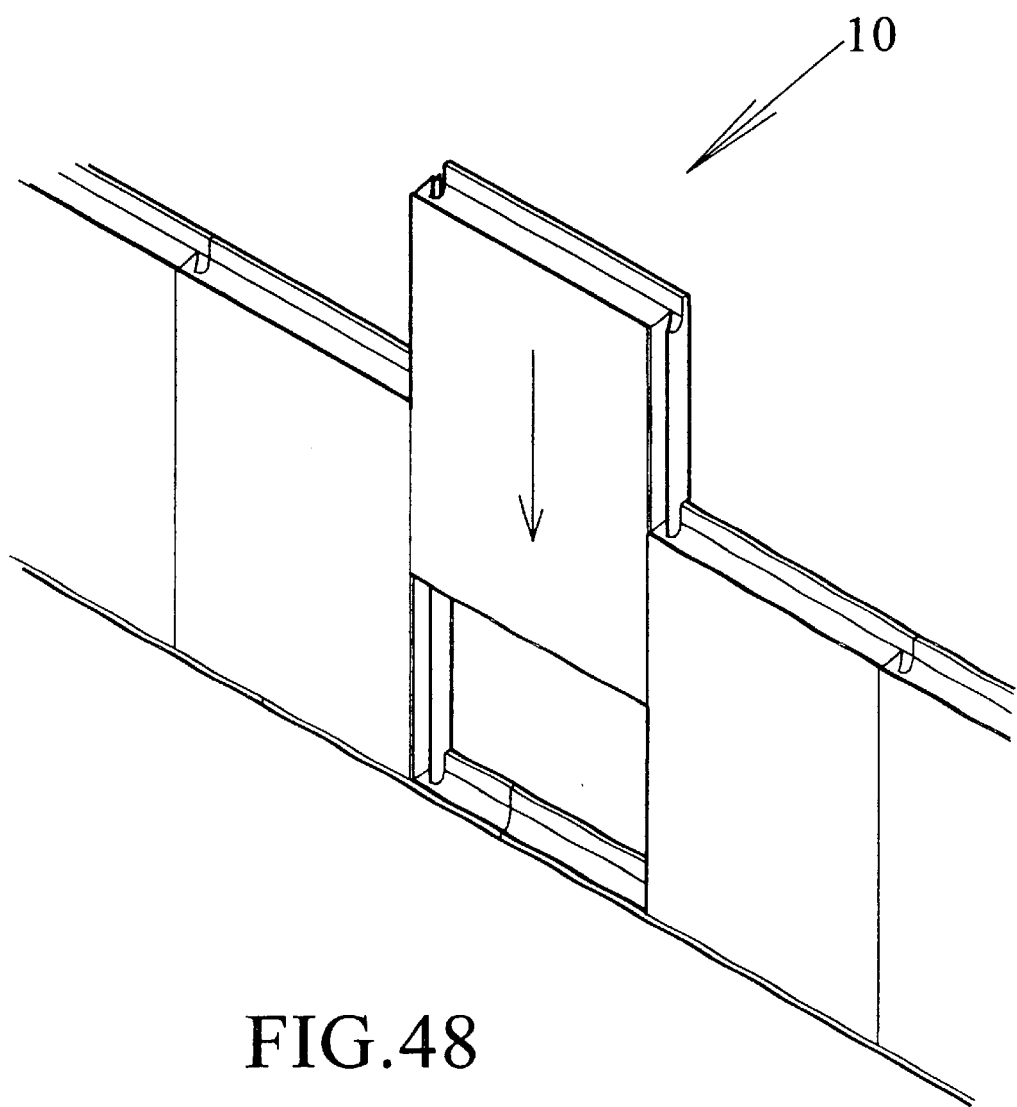

Referring now to FIGS. 46–48, the panels can be quickly and easily assembled and disassembled in the construction of a building. Prior to assembly of the panels, the third side groove 42 and the fourth side groove 56 and cavity 58 of each panel are cleaned, preferably by a blast of compressed air or the like, and a layer of adhesive, lubricant and/or sealant is applied therein. First, the third side groove 42 of a panel 10 is placed onto the first side tongue 40 of an adjacent panel 10, a starter piece, or the like, as shown in FIG. 46. The second side tongue 50 and head 52 of another panel 10 are then aligned with the fourth side groove 56 and cavity 58 of the installed panel 10, the sides are cleaned and prepared with an adhesive, lubricant, and/or sealant, and the second side tongue 50 and head 52 are slid down until the third side groove 42 is fully engaged, as shown in FIG. 47. The process is repeated until a row of panels 10 is completed by installation of a final panel 10, as shown in FIG. 48, and then the next row is begun by the same process. Disassembly is accomplished by the reverse process.

Accordingly, there are a number of advantages provided by the present invention. The modular panel with tongue and groove connections slide-lock with the tongue and groove connections of an adjacent panel, thus providing the advantage of quick and easy assembly and disassembly of a building.

Also, the panel has a side having a headed tongue that slide-locks with a groove with a cavity in a side of an adjacent panel, and may have aligning apertures in a tongue and in a grooved side of an adjacent panel for receiving a dowel to lock the panels together, providing the advantage of a modular panel having interlocking connections on all sides.

Furthermore, the panel has corner sections defined by longitudinally extending a profile of a side through a profile of an adjacent side, so that all sides and corners of the panel fully engage the sides and corners of an adjacent panel with no gaps or voids therebetween, providing the advantage of a modular panel for constructing a high-strength building capable of withstanding extreme loads caused by catastrophic events.

Additionally, the wall member has a surface with a recess defined therein and ribs extending from the recess, providing the advantage of a high-strength modular panel that is light-weight relative to other known high-strength building materials.

Moreover, the panels may have a generally square, trapezoidal, hexagonal, or octagonal planar shape, may have angled corner joints, may have a curvature relative to one or two axes, and may have a curvature and angled corner joints, providing the advantage of a modular panel for constructing buildings in a wide variety of shapes and sizes.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims. All patents, applications and publications referred to herein are hereby incorporated by reference in their entirety.

What is claimed is:

1. A modular panel for interlocking with adjacent panels, comprising:
   a) a wall member having at least four sides;
   b) the first side having at least one tongue extending therefrom;
   c) the second side having at least one tongue extending therefrom with at least one head at the outer end of the tongue;
   d) the third side having at least one groove defined therein for receiving a tongue of a first side of an adjacent panel;
   e) the fourth side having at least one groove defined therein with at least one cavity defined at the depth of the groove for slidingly receiving and locking therein a tongue and a head of a second side of an adjacent panel; and
   f) a first corner section defined by the intersection of the tongue of the first side and the tongue and head of the second side, the first corner section having at least one generally wedge-shaped channel defined in the tongue of the first side and formed by longitudinally extending the profile of the tongue and head of the second side through the tongue of the first side;
   g) wherein the first corner section has at least one curved cutaway surface on the tongue and head of the second side defined by longitudinally extending the profile of the tongue of the first side through the tongue and head of the second side, the curved cutaway surface comprising two generally symmetrical curved cutaway surfaces oppositely arranged on opposing faces of the tongue and head of the second side.

2. The panel of claim 1, wherein the at least one wedge-shaped channel of the first corner section comprises two generally symmetrical wedge-shaped channels oppositely arranged and defined in opposing faces of the tongue of the first side.

3. The panel of claim 1, wherein the tongue of the first side has a generally parabolic profile and the groove of the third side has a complementary generally parabolic profile.

4. The panel of claim 1, wherein the head of the tongue of the second side has a generally parabolic profile and the cavity of the groove of the fourth side has a complementary generally parabolic profile.

5. The panel of claim 1, wherein the head of the tongue of the second side has at least one catch surface, and the cavity of the groove of the fourth side has at least one complementary catch surface, for securing the head of the second side in a cavity of a fourth side of an adjacent panel while allowing sliding movement in a direction parallel with the second and fourth sides.

6. The panel of claim 1, wherein the wall member has a surface with a recess defined therein.

7. The panel of claim 6, further comprising ribs extending from the recess.

8. The panel of claim 1, wherein the third side is generally parallel and oppositely aligned with the first side, and the fourth side is generally parallel and oppositely aligned with the second side.

9. The panel of claim 1, wherein the wall member has a curvature relative to one axis or relative to two axes.

10. The panel of claim 1, further comprising at least one first aperture defined in the first side tongue, at least one second aperture defined in the third side and alignable with the second aperture when the first side tongue is received in the third side groove of an adjacent panel, and a dowel receivable through the first and second apertures.

11. The panel of claim 1, further comprising at least one third aperture defined in the second side tongue, at least one fourth aperture defined in the fourth side and alignable with the third aperture when the second side tongue is received in the fourth side groove of an adjacent panel, and a dowel receivable through the third and fourth apertures.

12. A modular panel for interlocking with adjacent panels, comprising:
    a) a wall member having at least four sides;
    b) the first side having at least one tongue extending therefrom;
    c) the second side having at least one tongue extending therefrom with at least one head at the outer end of the tongue;
    d) the third side having at least one groove defined therein for receiving a tongue of a first side of an adjacent panel;
    e) the fourth side having at least one groove defined therein with at least one cavity defined at the depth of the groove for slidingly receiving and locking therein a tongue and a head of a second side of an adjacent panel; and
    f) a first corner section defined by the intersection of the tongue of the first side and the tongue and head of the second side the first corner section having at least one generally wedge-shaped channel defined in the tongue of the first side and formed by longitudinally extending the profile of the tongue and head of the second side through the tongue of the first side;
    g) wherein the intersection of the tongue and head of the second side and the third side defines a second corner section having at least one curved cutaway surface forming a groove in the tongue and head of the second side and defined by longitudinally extending the profile of the groove of the third side through the tongue and head of the second side.

13. The panel of claim 12, wherein the second corner section has two generally symmetrical arms longitudinally extending from the head of the tongue of the second side, and the cutaway surface is arranged between the two arms.

14. A modular panel for interlocking with adjacent panels comprising:
    a) a wall member having at least four sides;
    b) the first side having at least one tongue extending therefrom;
    c) the second side having at least one tongue extending therefrom with at least one head at the outer end of the tongue;
    d) the third side having at least one groove defined therein for receiving a tongue of a first side of an adjacent panel;
    e) the fourth side having at least one groove defined therein with at least one cavity defined at the depth of the groove for slidingly receiving and locking therein a tongue and a head of a second side of an adjacent panel; and
    f) a first corner section defined by the intersection of the tongue of the first side and the tongue and head of the second side, the first corner section having at least one generally wedge-shaped channel defined in the tongue of the first side and formed by longitudinally extending the profile of the tongue and head of the second side through the tongue of the first side;
    g) wherein the intersection of the third side and the fourth side defines a third corner section having at least one curved cutaway surface on at least one inner wall of the groove of the third side defined by longitudinally extending the profile of the groove and cavity of the fourth side through the third side.

15. The panel of claim 14, wherein the cutaway surface of the third corner section has a portion defined by two generally symmetrical wedge-shaped channels defined in oppositely facing inner walls of the groove of third side.

16. A modular panel for interlocking with adjacent panels, comprising:
    a) a wall member having at least four sides;
    b) the first side having at least one tongue extending therefrom;
    c) the second side having at least one tongue extending therefrom with at least one head at the outer end of the tongue;
    d) the third side having at least one groove defined therein for receiving a tongue of a first side of an adjacent panel;
    e) the fourth side having at least one groove defined therein with at least one cavity defined at the depth of the groove for slidingly receiving and locking therein a tongue and a head of a second side of an adjacent panel; and
    f) a first corner section defined by the intersection of the tongue of the first side and the tongue and head of the second side the first corner section having at least one generally wedge-shaped channel defined in the tongue of the first side and formed by longitudinally extending the profile of the tongue and head of the second side through the tongue of the first side;
    g) wherein the intersection of the fourth side and the first side defines a fourth corner section having at least one curved cutaway surface forming a groove and cavity in the tongue of the first side and defined by longitudinally extending the profile of the groove and cavity of the fourth side through the tongue of the first side.

17. The panel of claim 16, wherein the fourth corner section has two generally symmetrical wedge-shaped arms extending from the first side, and the cutaway surface is arranged between the two arms.

18. A modular panel for interlocking with adjacent panels, comprising:
    a) a wall member having at least four sides, wherein the wall member has a generally square, rectangular, trapezoidal, hexagonal, or octagonal planar shape;

b) the first side having at least one tongue extending therefrom;
c) the second side having at least one tongue extending therefrom with at least one head at the outer end of the tongue;
d) the third side having at least one groove defined therein for receiving a tongue of a first side of an adjacent panel;
e) the fourth side having at least one groove defined therein with at least one cavity defined at the depth of the groove for slidingly receiving and locking therein a tongue and a head of a second side of an adjacent panel; and
f) a first corner section defined by the intersection of the tongue of the first side and the tongue and head of the second side, the first corner section having at least one generally wedge-shaped channel defined in the tongue of the first side and formed by longitudinally extending the profile of the tongue and head of the second side through the tongue of the first side.

19. A modular panel for interlocking with adjacent panels, comprising:
a) a wall member having at least four sides;
b) the first side having at least one tongue extending therefrom;
c) the second side having at least one tongue extending therefrom with at least one head at the outer end of the tongue, wherein the tongue and head of the second side extend from the second side at an angle from the plane of the wall member;
d) the third side having at least one groove defined therein for receiving a tongue of a first side of an adjacent panel;
e) the fourth side having at least one groove defined therein with at least one cavity defined at the depth of the groove for slidingly receiving and locking therein a tongue and a head of a second side of an adjacent panel; and
f) a first corner section defined by the intersection of the tongue of the first side and the tongue and head of the second side, the first corner section having at least one generally wedge-shaped channel defined in the tongue of the first side and formed by longitudinally extending the profile of the tongue and head of the second side through the tongue of the first side.

20. A modular panel for interlocking with adjacent panels, comprising:
a) a wall member having at least four sides;
b) the first side having at least one tongue extending therefrom;
c) the second side having at least one tongue extending therefrom with at least one head at the outer end of the tongue;
d) the third side having at least one groove defined therein for receiving a tongue of a first side of an adjacent panel;
e) the fourth side having at least one groove defined therein with at least one cavity defined at the depth of the groove for slidingly receiving and locking therein a tongue and a head of a second side of an adjacent panel, wherein the groove and cavity of the fourth side are defined in the fourth side at an angle from the plane of the wall; and
f) a first corner section defined by the intersection of the tongue of the first side and the tongue and head of the second side the first corner section having at least one generally wedge-shaped channel defined in the tongue of the first side and formed by longitudinally extending the profile of the tongue and head of the second side through the tongue of the first side.

21. A modular panel for interlocking with adjacent panels, comprising:
a) a wall member having four sides;
b) the first side having at least one tongue extending therefrom;
c) the second side having at least one tongue extending therefrom with at least one head at the outer end of the tongue;
d) the third side having at least one groove defined therein for receiving a tongue of a first side of an adjacent panel, the third side generally parallel and oppositely aligned with the first side;
e) the fourth side having at least one groove defined therein with at least one cavity defined at the depth of the groove for receiving a tongue and a head of a second side of an adjacent panel, the fourth side generally parallel and oppositely aligned with the second side;
f) a first corner section defined by the intersection of the tongue of the first side and the tongue and head of the second sides the first corner section having at least one curved cutaway surface on the tongue and head of the second side defined by longitudinally extending the profile of the tongue of the first side through the tongue and head of the second side, the first corner section having at least one generally wedge-shaped channel defined in the tongue of the first side and formed by longitudinally extending the profile of the tongue and head of the second side through the tongue of the first side
g) a second corner section defined by the intersection of the tongue and head of the second side and the third side, having at least one curved cutaway surface forming a groove in the tongue and head of the second side and defined by longitudinally extending the profile of the groove of the third side through the tongue and head of the second side;
h) a third corner section defined by the intersection of the third side with the fourth side, having at least one curved cutaway surface on at least one inner wall of the groove of the third side defined by longitudinally extending the profile of the groove and cavity of the fourth side through the third side; and,
i) a fourth corner section defined by the intersection of the fourth side with the tongue of the first side, having at least one curved cutaway surface forming a groove and cavity in the tongue of the first side and defined by longitudinally extending the profile of the groove and cavity of the fourth side through the tongue of the first side.

22. The panel of claim 21, wherein the first corner section has a surface, and the third corner section has a surface capable of contacting the entire surface of the first corner section of an adjacent panel.

23. The panel of claim 21, wherein the second corner section has a surface, and the fourth corner section has a surface capable of contacting the entire surface of the second corner section of an adjacent panel.

24. The panel of claim 21, further comprising a plurality of said panels interlocked together to form building.

* * * * *